United States Patent
Creto et al.

(10) Patent No.: US 11,622,083 B1
(45) Date of Patent: Apr. 4, 2023

(54) METHODS, SYSTEMS, AND DEVICES FOR PRESENTING OBSCURED SUBJECT COMPENSATION CONTENT IN A VIDEOCONFERENCE

(71) Applicant: Motorola Mobility LLC, Chicago, IL (US)

(72) Inventors: Alexandre Neves Creto, Sao Jose dos Campos (BR); Amit Kumar Agrawal, Bangalore (IN); Robert S Witte, Algonquin, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/536,707

(22) Filed: Nov. 29, 2021

(51) Int. Cl.
*H04N 5/272* (2006.01)
*H04N 7/15* (2006.01)
*G06V 40/16* (2022.01)
*G06T 13/40* (2011.01)
*H04N 5/265* (2006.01)

(52) U.S. Cl.
CPC ............ *H04N 5/272* (2013.01); *G06T 13/40* (2013.01); *G06V 40/176* (2022.01); *H04N 5/265* (2013.01); *H04N 7/157* (2013.01); *H04N 2005/2726* (2013.01)

(58) Field of Classification Search
CPC ........ H04N 5/272; H04N 5/265; H04N 7/157; H04N 2005/2726; G06T 13/40; G06V 40/176
See application file for complete search history.

(56) References Cited

U.S. PATENT DOCUMENTS

| | | | |
|---|---|---|---|
| 6,771,303 B2 | 8/2004 | Zhang et al. | |
| 11,366,321 B1* | 6/2022 | Grundhoefer | G09G 5/10 |
| 2016/0217621 A1* | 7/2016 | Raghoebardajal | H04N 13/366 |
| 2016/0341959 A1* | 11/2016 | Gibbs | G06V 20/20 |
| 2018/0101984 A1* | 4/2018 | Frueh | G06T 17/00 |
| 2019/0163267 A1* | 5/2019 | Hainzl | G06F 3/013 |
| 2020/0363635 A1* | 11/2020 | Ilic | G06F 3/013 |
| 2021/0281802 A1* | 9/2021 | Kirisken | G02B 27/017 |
| 2021/0360199 A1* | 11/2021 | Oz | H04N 7/157 |

* cited by examiner

*Primary Examiner* — Kelly L Jerabek
(74) *Attorney, Agent, or Firm* — Philip H. Burrus, IV

(57) ABSTRACT

A conferencing system terminal device includes an image capture device capturing images of a subject during a videoconference occurring across a network and a communication device transmitting the images to at least one remote electronic device engaged in the videoconference. The conferencing system terminal device includes one or more sensors determining that one or more portions of the subject are obscured in the images and one or more processors. The one or more processors apply obscured subject compensation content to the images at locations where the one or more portions of the subject are obscured, during the videoconference, and prior to the communication device transmitting the images to the at least one remote electronic device engaged in the videoconference.

20 Claims, 10 Drawing Sheets

METHODS, SYSTEMS, AND DEVICES FOR PRESENTING OBSCURED SUBJECT COMPENSATION CONTENT IN A VIDEOCONFERENCE

BACKGROUND

Technical Field

This disclosure relates generally to electronic devices, and more particularly to electronic devices capable of providing video conferencing features.

Background Art

Many modern electronic devices, including smartphones, tablet computers, and laptop computers, are equipped to engage in videoconferences with other electronic devices across a network. Users employ such devices to communicate with friends, family, and work colleagues. This is especially true during times of pandemic, when people work remotely rather than going to a centralized office. Participants engage videoconferencing to engage in real-time discussions and share electronic content. Videoconferencing additionally offers participants the ability to see other participants via video feeds streamed to the participating electronic devices.

Despite the fact that videoconferences have become ubiquitous, they are not without issues. For instance, people tend to look at their own image on a display during a video conference rather than at the camera. When everyone does this, no participant is looking into the eyes of any other participant. Additionally, with the advent of new electronic devices many people do not use conventional computers for videoconferences. They instead use devices like smartphones and even augmented reality glasses. Some of these devices obscure the participant's eyes, making them difficult to see. It would be advantageous to have an improved methods, systems, and devices to facilitate increased eye contact between participants of a video conference.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
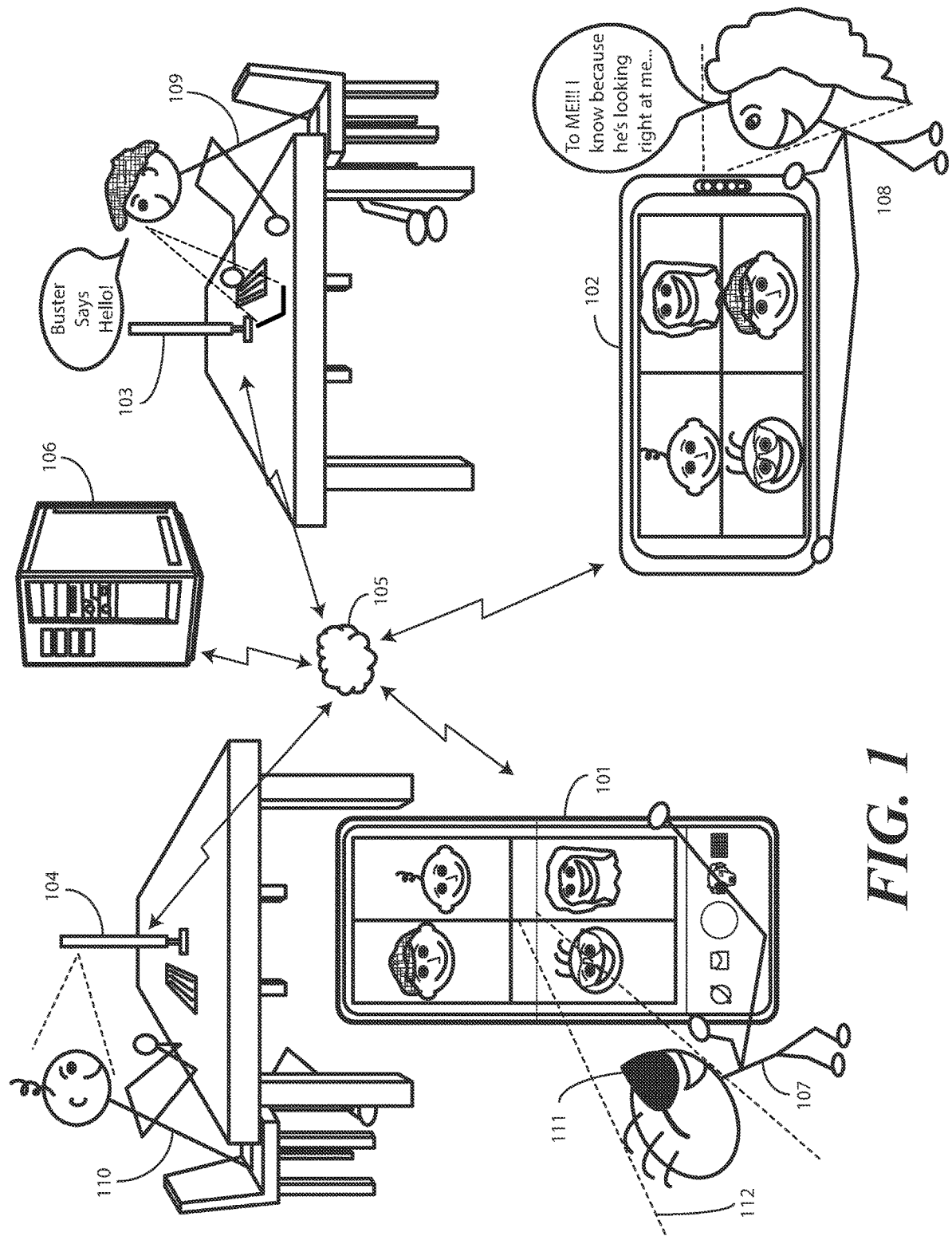
FIG. 1 illustrates one explanatory conferencing system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to automatically applying obscured subject compensation content to images of a videoconference at locations where one or more portions of a subject are obscured. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of applying obscured subject compensation content to portions of images of a video feed in a videoconference corresponding to one or more portions of a subject that are obscured to create less obscured images of the subject as described herein. The non-processor circuits may include, but are not limited to, a radio receiver, a radio transmitter, signal drivers, clock circuits, power source circuits, and user input devices. As such, these functions may be interpreted as steps of a method to perform the generation and application of obscured subject compensation content when one or more portions of a face of a subject engaged in a videoconference are obscured, and thereafter applying the obscured subject compensation content upon depictions of the one or more portions of the face of the subject in one or more videoconference feeds to create one or more less obscured videoconference feeds for delivery to conferencing system terminal devices engaged in the videoconference.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

In response to the COVID-19 pandemic, never before have employees worked remotely on such a massive scale. When millions of companies went fully remote in a short period of time to slow the spread of the Coronavirus Disease 2019, videoconferencing became the logical solution for connecting the remote workforce and keeping teams productive from home. In a matter of weeks, video conferencing usage exploded, permeating nearly all aspects of professional and personal life. In addition to business-related meetings, remote teams around the globe began using video conferencing to host virtual happy hours, ice breaker activities, online games, wine tastings, birthday parties, and other social activities.

With the advent of new electronic devices, many people do not use conventional computers for videoconferences. They instead use devices like smartphones and even augmented reality glasses. Consider the situation, for example, where a person wants to look their best during an upcoming interview arranged in the form of a videoconference. Now consider the situation where the person has been traveling and does not have access to a conventional computer but does have access to augmented reality glasses and a smartphone. Fortunately, the person can use the camera of the smartphone to capture a video feed of his visage during the interview. Since the screen is so small, the person can also use the augmented reality glasses to view the video feeds at a sufficiently large size.

After aligning the camera of the smartphone with the person's eyes and donning the augmented reality glasses, the person notices an unwanted side effect. Specifically, the person notices that the augmented reality glasses obscure his eyes, making them less than visible by the smartphone. This can be incredibly problematic in that the interviewer will not be able to see the person's eyes, and may therefore be unable to assess emotional reactions and interpersonal communication skills of the person.

A similar problem arises when a person joins a videoconference wearing sunglasses. If the lenses are sufficiently dark, none of the other participants are able to see the shade wearer's eyes. This prevents the other participants from assessing the shade wearer's eyes and expressions, which leads to less effective communications.

Advantageously, embodiments of the disclosure provide a solution to these problems. In one or more embodiments, a conferencing system terminal device comprises an image capture device capturing images of a subject during a videoconference occurring across a network. A communication device transmits the images to at least one remote electronic device engaged in the videoconference.

In one or more embodiments, one or more sensors of the conferencing system terminal device determine that one or more portions of a subject of one of the video feeds are obscured in the images of the video feed. One or more processors then apply obscured subject compensation content to the images at locations where the one or more portions of the subject are obscured, during the videoconference, and prior to the communication device transmitting the images to the at least one remote electronic device engaged in the videoconference. For example, if the subject's eyes are obscured, the one or more processors may superimpose imagery of the subjects eyes atop the obscured portions of the images.

Thus, in one or more embodiments one or more processors of a conferencing system terminal device detect that a person is initiating, or is already in, an active videoconference. The one or more processors also determine that the user is using an image capture device of the conferencing system terminal device to share a video feed including one or more images depicting themself.

In one or more embodiments, the one or more processors use image processing and/or image/object recognition to determine that the person is wearing either augmented reality glasses or sunglasses, and that the eyewear obscures portions of the person's face and/or eyes. The one or more processors may determine that this obscuration makes it difficult or impossible for the other participants to see person's eyes and/or clearly and assess their expressions.

In one or more embodiments, in response to determining these pre-conditions, the one or more processors apply obscured subject compensation content to the images at locations where the one or more processors portions of the subject are obscured. Illustrating by example, the one or more processors may superimpose computer-generated imagery (CGI), an animation, previously recorded video or images of the person, or other compensating content overlays to cause the images of the person to be less obscured.

In one or more embodiments, the application of the obscured subject compensation content occurs automatically when the pre-conditions described above are detected. In other embodiments, the application of the obscured subject compensation content can occur in response to user input requesting the same. Of course, a combination of the two approaches can be used as well. The system can apply obscured subject compensation content to images not only when eyewear is obscuring portions of the subject in the images, but when other objects are obscuring portions of the subject as well. Illustrating by example, if the subject is reading a book while engaged in a videoconference, with the book obscuring portions of the person's face or torso, the one or more processors can apply obscured subject compensation content to these portions to create less obscured images as well.

The application of the obscured subject compensation content can occur locally in a conferencing system terminal device in one or more embodiments. In other embodiments, a conferencing system server complex can apply the obscured subject compensation content. Illustrating by example, in one or more embodiments a conferencing system server complex comprises a video conferencing engine delivering video conferencing content to a plurality of conferencing system terminal devices during a videoconference. An obscured subject monitoring engine monitors for portions of the participants being obscured by eyewear or other objects in the videoconference. One or more processors generate obscured subject compensation content when one or more portions of a face of a subject engaged in the videoconference are obscured. The one or more processors apply the obscured subject compensation content upon depictions of the one or more portions of the face of the subject in one or more videoconference feeds to create one or more less obscured videoconference feeds. Thereafter, the conferencing system server complex delivers the one or more less obscured videoconference feeds to the plurality of conferencing system terminal devices.

Figure 10:
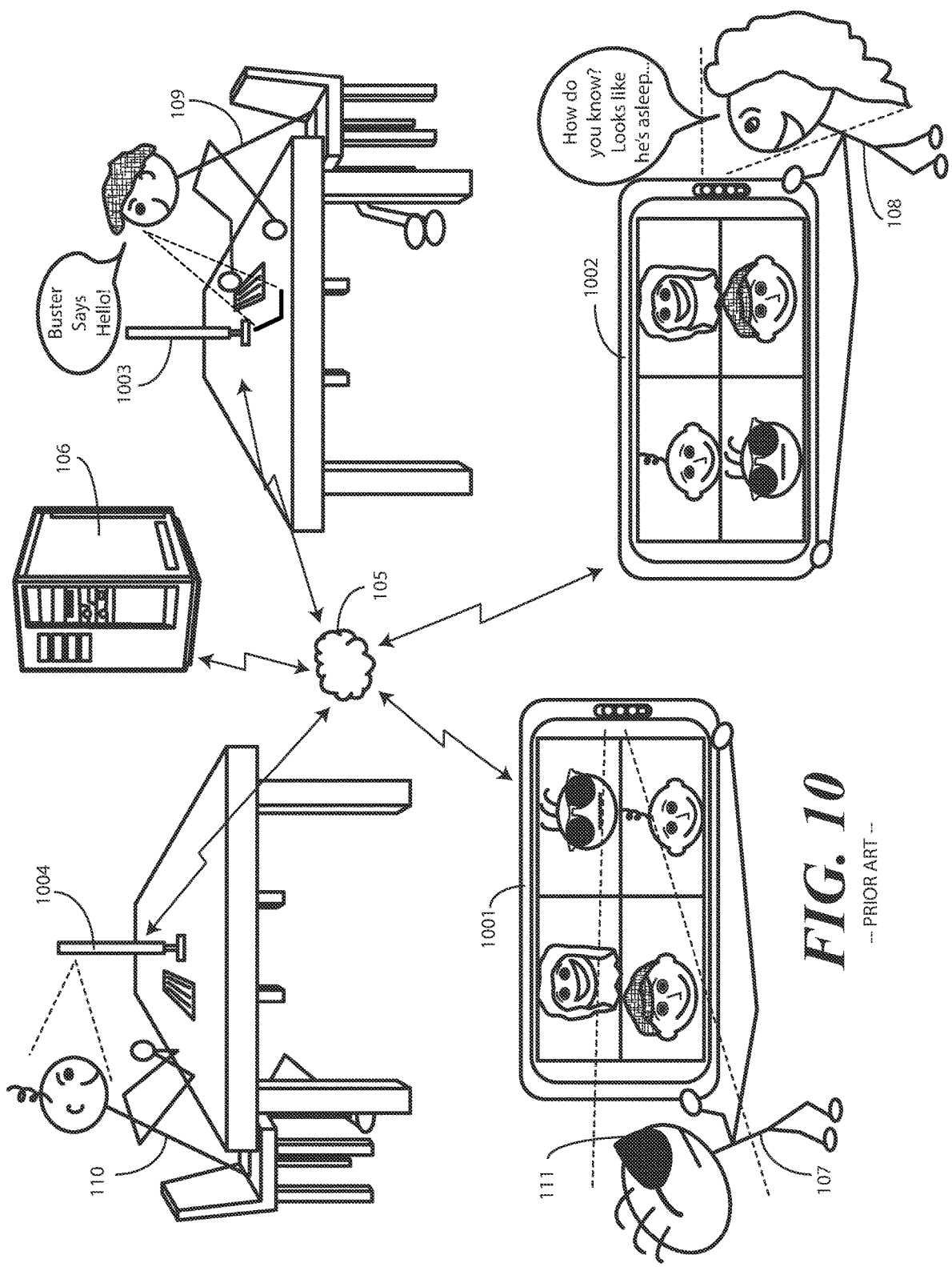
FIG. 10 illustrates a prior art conferencing system.

Turning now to FIG. 10, illustrated therein is a prior art videoconference system. As shown, multiple participants 107,108,109,110 each employ their own respective conferencing system terminal device 1001,1002,1003,1004 to engage with the other participants via the videoconference.

Since the participants 107,108,109,110 are all engaged in a videoconference, each can see conference content in the form of a combined video feed from each other participant 107,108,109,110 presented on the display of each conferencing system terminal device 1001,1002,1003,1004, as well as a video feed of themselves. Under ordinary conditions, each participant 107,108,109,110 can hear an audio feed from each other participant 107,108,109,110 as well.

In this illustrative embodiment, participant 107, Buster, is wearing sunglasses 111. Consequently, none of the other participants 108,109,110 can see either Buster's eyes or the portions of Buster's face around his eyes that are obscured by the sunglasses 111. Participant 109 is speaking, suggesting that Buster, "says hello." However, none of the participants can assess Buster's eyes or his emotions. Participant 108 questions this allegation due to the fact that she cannot assess Buster's expressions, stating, "how do you know?—looks like he's asleep."

Embodiments of the disclosure contemplate that this is a very common problem that occurs frequently during videoconferences. When a participant 107 is wearing sunglasses 111, the other participants 108,109,110 can hardly see the eyes of participant 107, which makes it difficult or impossible to assess the emotions and expressions of participant 107. This leads to a loss of effective communication between the participants 107,108,109,110 of the videoconference. This problem can occur with other types of eyewear as well, including augmented reality glasses. Moreover, when an object such as a document, book, pandemic mask, or other item partially obscures a portion of a participant, communication can be diminished or lost.

Embodiments of the disclosure provide a solution to this problem by applying obscured subject compensation content to portions of images where a person is obscured. Turning now to FIG. 1, illustrated therein is one explanatory videoconference system configured in accordance with embodiments of the disclosure illustrating how this can occur.

As shown in FIG. 1, multiple participants 107,108,109,110 each employ their own respective conferencing system terminal device 101,102,103,104 to engage with the other participants via the videoconference. In this illustrative embodiment, conferencing system terminal devices 101,102 are shown as smartphones, while conferencing system terminal devices 103,104 are shown as desktop computers. However, conferencing system terminal devices suitable for use in the videoconference system can take other forms as well. For instance, tablet computers, notebook computers, audiovisual devices, mobile phones, smart watches, or other devices can be used by participants to engage in the videoconference as well. Other examples of conferencing system terminal devices will be obvious to those of ordinary skill in the art having the benefit of this disclosure.

As shown in FIG. 1, each conferencing system terminal device 101,102,103,104 is engaged in wired or wireless communication with each other across a network 105, one example of which is the Internet via the World Wide Web. It should be noted that the network 105 could be a public, private, local area, wide area, or other type of network across which wired or wireless electronic communications can be exchanged.

In this illustrative embodiment, each conferencing system terminal device 101,102,103,104 is also in communication with a video conferencing system server complex 106 across the network 105. As will be described in more detail with reference to FIG. 7 below, in one or more embodiments video conferencing system server complex 106 includes components such as a web server, a database server, an audio server, and optionally a video server (the video server may be omitted for audio only conferencing systems) that are operable to facilitate videoconferences between the various conferencing system terminal devices 101,102,103,104 of the videoconference system.

These components of the video conferencing system server complex 106 can be combined on the same server. Alternatively, these components can be distributed on any number of servers to increase load handling capacity beyond that of a single server, and so forth. Other configurations for the video conferencing system server complex 106 will be obvious to those of ordinary skill in the art having the benefit of this disclosure.

In one or more embodiments, the video conferencing system server complex 106 performs functions such as maintaining a schedule of videoconferences, maintaining lists of participants, as well as allowing each participant's conferencing system terminal device to engage with the videoconference, and so forth. In one or more embodiments, the video conferencing system server complex 106 also facilitates the transmission of audio and video content during the occurrence of the videoconference.

In one or more embodiments, the video conferencing system server complex 106 functions as an intermediary device to facilitate sharing of audio and/or video content and/or data between the various conferencing system terminal devices 101,102,103,104. For example, as can be seen on the displays of conferencing system terminal devices 101, 102, in this example each participant 107,108,109,110 can see each other participant engaged in the videoconference.

In the illustrative example of FIG. 1, since the participants 107,108,109,110 are all engaged in a videoconference, each can see conference content in the form of a combined video feed from each other participant 107,108,109,110 presented on the display of each conferencing system terminal device 101,102,103,104, as well as a video feed of themselves. Under ordinary conditions, each participant 107,108,109, 110 can hear an audio feed from each other participant 107,108,109,110 as well.

Once again, participant 107, Buster, is wearing sunglasses 111. However, since the system of FIG. 1 is configured in accordance with one or more embodiments of the disclosure. the other participants 108,109,110 can still see both Buster's eyes or the portions of Buster's face around his eyes that are obscured by the sunglasses 111. Participant 109 is speaking after assessing Buster's eyes, stating that Buster, "says hello." Participant 108, seeing those same eyes, agrees wholeheartedly with this statement, stating, "I know! He's looking right at me!"

This occurs due to the fact that either Buster's conferencing system terminal device 101 or the conferencing system server complex 106 is configured to apply obscured subject compensation content to the images of Buster at locations where one or more portions of Buster's face are obscured, during the videoconference, and prior to the video feed of Buster being delivered to the other conferencing system terminal devices 102,103,104. In one or more embodiments, conferencing system terminal device 101 comprises an image capture device capturing one or more images 112 of participant 107 during this videoconference, which is occurring across the network 105. The conferencing system terminal device 101 also includes a communication device transmitting the one or more images 112 to the other conferencing system terminal devices 102,103,104. One or more sensors of the conferencing system terminal device determine that one or more portions of participant 107 are obscured in the images 112.

One or more processors of the conferencing system terminal device 101 then apply obscured subject compensation content to the images at locations where the one or more portions of the participant 107 are obscured, during the videoconference, and prior to the communication device transmitting the images 112 to the other conferencing system terminal devices 102,103,104. In this illustration, the one or more sensors determine that at least one portion of participant 107 is obscured by eyewear. The one or more processors of the conferencing system terminal device 101 then apply obscured subject compensation content that comprises imagery depicting the eyes of participant 107, as shown in the displays of conferencing system terminal device 101 and conferencing system terminal device 102. In this illustrative embodiment, the one or more processors of the conferencing system terminal device 101 apply the obscured subject compensation content within an outer boundary defined by the frames of the eyewear, as also shown in the displays of conferencing system terminal device 101 and conferencing system terminal device 102.

The obscured subject compensation content can take different forms. In one or more embodiments, the obscured subject compensation content comprises computer-generated images of the portions of the participant 107 that are obscured by the sunglasses 111. For instance, in FIG. 1 the obscured subject compensation content comprises computer-generated images of the eyes of participant 107. In other embodiments, the obscured subject compensation content can comprise an animation depicting portions of the participant 107 that are obscured by the sunglasses 111. In still other embodiments, the obscured subject compensation content can comprise previously captured video or images of the portions of the participant that are obscured by the sunglasses 111. Where the eyewear is equipped with an image capture device, as are the augmented reality glasses of FIG. 2 below, the obscured subject compensation content can comprise presently captured images of the portions of the participant 107 that are obscured by the sunglasses 111. Other examples of obscured subject compensation content will be obvious to those of ordinary skill in the art having the benefit of this disclosure.

In other embodiments, rather than the conferencing system terminal device 101 performing all of these functions, some or all of the functions can be performed by the conferencing system server complex 106. As will be described in more detail below with reference to FIG. 7, in one or more embodiments the conferencing system server complex 106 comprises a video conferencing engine delivering video conferencing content to a plurality of conferencing system terminal devices 101,102,103,104 during a videoconference.

The conferencing system server complex 106 can also include an obscured subject monitoring engine. In one or more embodiments, one or more processors of the conferencing system server complex 106 generate obscured subject compensation content when the obscured subject monitoring engine detects one or more portions of a face of a participant 107 engaged in the videoconference are obscured. The one or more processors can apply the obscured subject compensation content upon depictions of the one or more portions of the face of the subject 107 in one or more videoconference feeds to create one or more less obscured videoconference feeds. The conferencing system server complex 106 can then deliver the one or more less obscured videoconference feeds to the various conferencing system terminal devices 101,102,103,104.

Advantageously, embodiments of the disclosure provide devices, systems, and methods that prevent awkward situations that can occur in videoconferences when portions of a participant are obscured. Additionally, embodiments of the disclosure provide unique and interesting ways to make the videoconference (100) more fun, engaging, interesting, and entertaining, even in situations where participants wear sunglasses, COVID masks, or other facial coverings. Embodiments of the disclosure accomplish this by providing a conferencing system terminal device 101 that includes one or more processors that automatically apply obscured subject compensation content in images of a videoconference atop obscured portions of a subject like participant 107. In one or more embodiments, this obscured subject compensation content is applied as overlay indicia that can be dynamically and automatically be applied to images of a videoconference as well.

In one or more embodiments, the one or more processors of the conferencing system terminal device 101 automatically apply the obscured subject compensation content as a function of obscured portions of participants detected by one or more sensors of the conferencing system terminal device 101. In one or more embodiments, the application of the obscured subject compensation content occurs during the videoconference (100) and prior to a communication device of the conferencing system terminal device 101 transmitting the images to at least one remote electronic device engaged in the videoconference.

Illustrating by example, in one or more embodiments the communication device of the conferencing system terminal device 101 receives one or more videoconference feeds depicting one or more subjects, e.g., participant 107, engaged in the videoconference from one or more remote electronic devices, one example of which is conferencing system terminal device 103. An obscured subject detection engine of the conferencing system terminal device 101 then detects that one or more portions of a subject of one or more of the video feeds is obscured. One or more processors of the conferencing system terminal device 101 then apply obscured subject compensation content, optionally as overlay indicia that is computer-generated or previously captured to at least one videoconference feed during the videoconference. Thereafter, a display of the conferencing system terminal device then presents the at least one videoconference feed after the obscured subject compensation content is applied.

Advantageously, by automatically applying the obscured subject compensation content to a videoconference feed, embodiments of the disclosure automatically and dynamically create surprising, unique, appropriate, and less obscured images for display during a videoconference. Accordingly, embodiments of the disclosure provide systems, methods, and devices that allow participants in a videoconference to feel fully engaged with other participants, thereby creating interesting and "cool" effects for everyone engaged in a videoconference.

Figure 3:
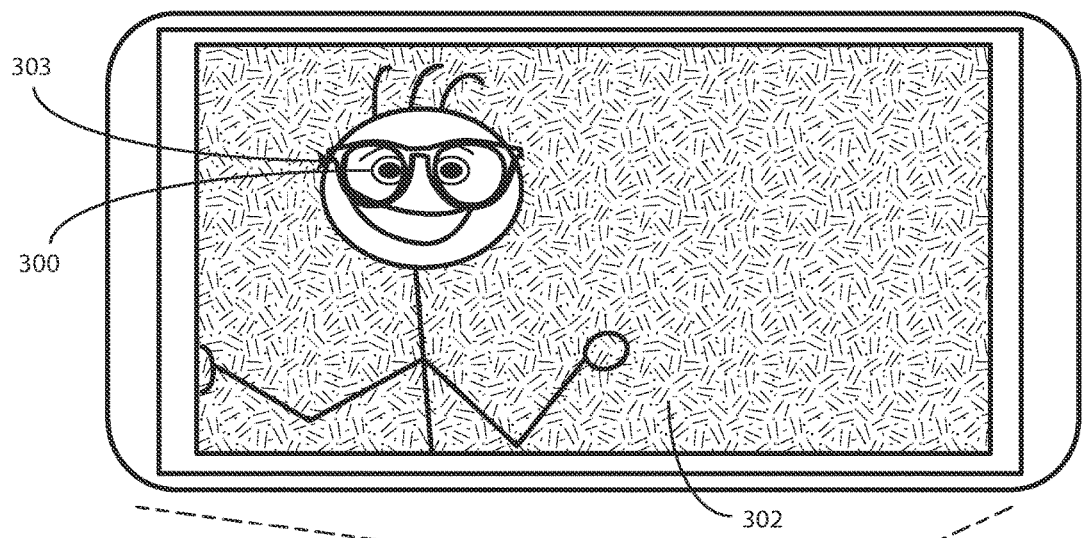
FIG. 3 illustrates portions of the conferencing system of FIG. 1 according to one or more other embodiments of the disclosure.
Figure 3:
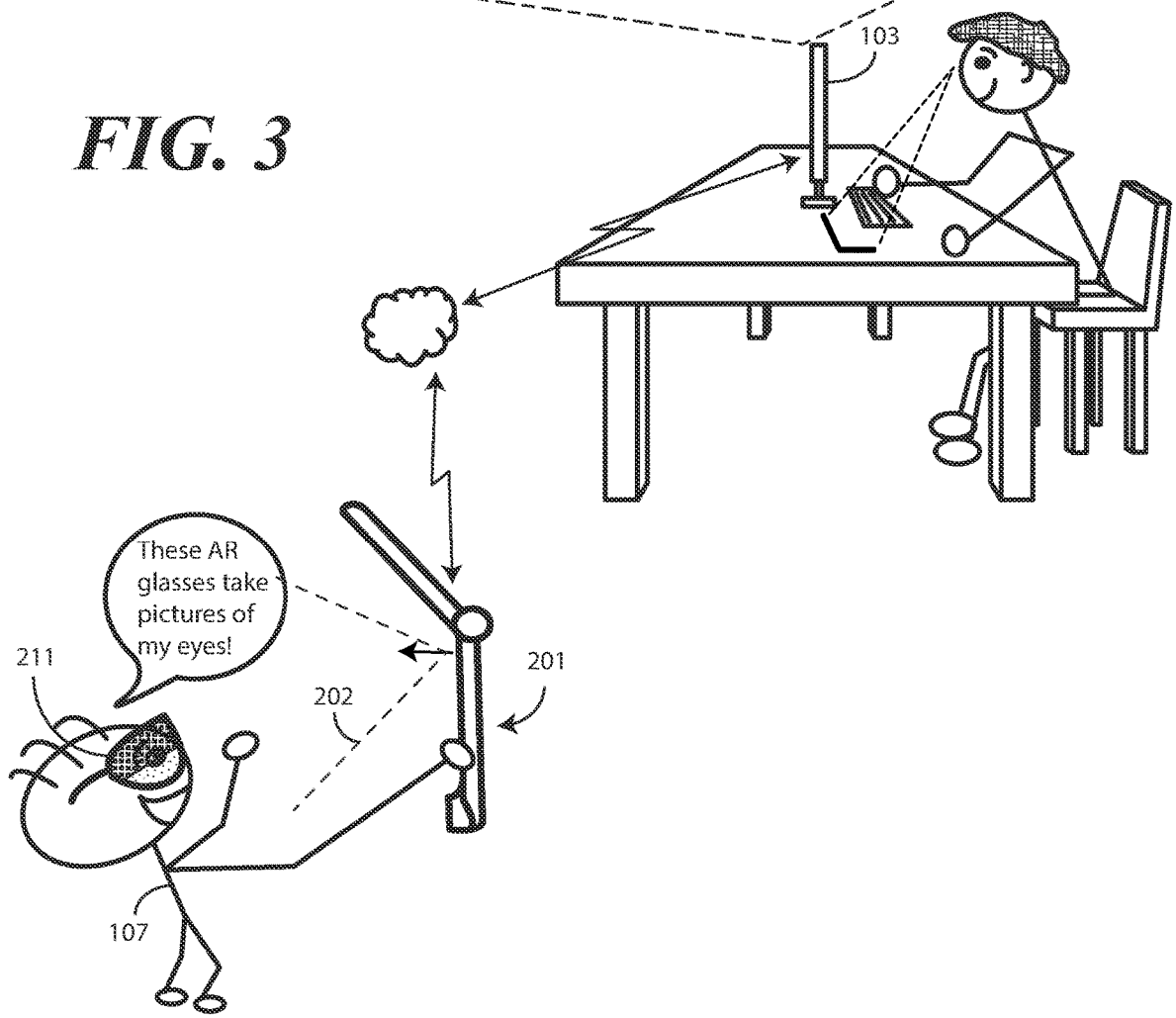
Figure 4:
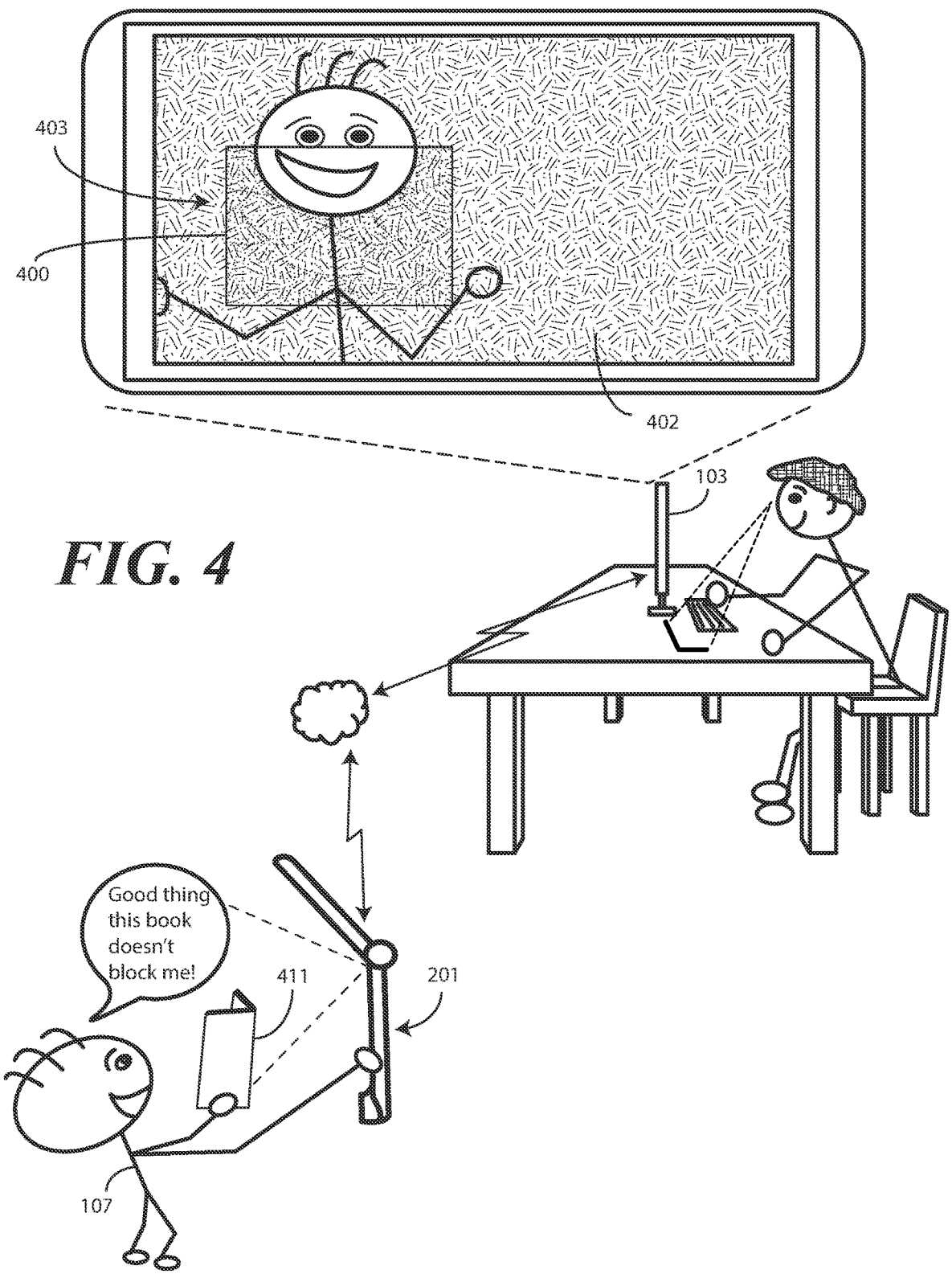
FIG. 4 illustrates portions of the conferencing system of FIG. 1 according to still one or more other embodiments of the disclosure.

As noted above, the obscured subject compensation content can take various forms. It can include computer-generated content, previously captured content, animated content, or presently captured content. Examples are shown in FIGS. 2-4 below.

Beginning with FIG. 2, participant 107 is again wearing sunglasses 111. The sunglasses 111 are obscuring portions of the participant's face. Additionally, the sunglasses 111 are conventional sunglasses that are not equipped with any image capture device.

As previously described, one or more processors of the participant's conferencing system terminal device 201 apply obscured subject compensation content 200 to the images 202 of the videoconference at locations 203 where the one or more portions of participant 107 are obscured. In one or more embodiments, the one or more processors apply this obscured subject compensation content 200 during the videoconference and prior to the communication device of the conferencing system terminal device 201 transmitting the images 202 to at least one remote electronic device engaged in the videoconference, e.g., conferencing system terminal device 103.

Figure 2:
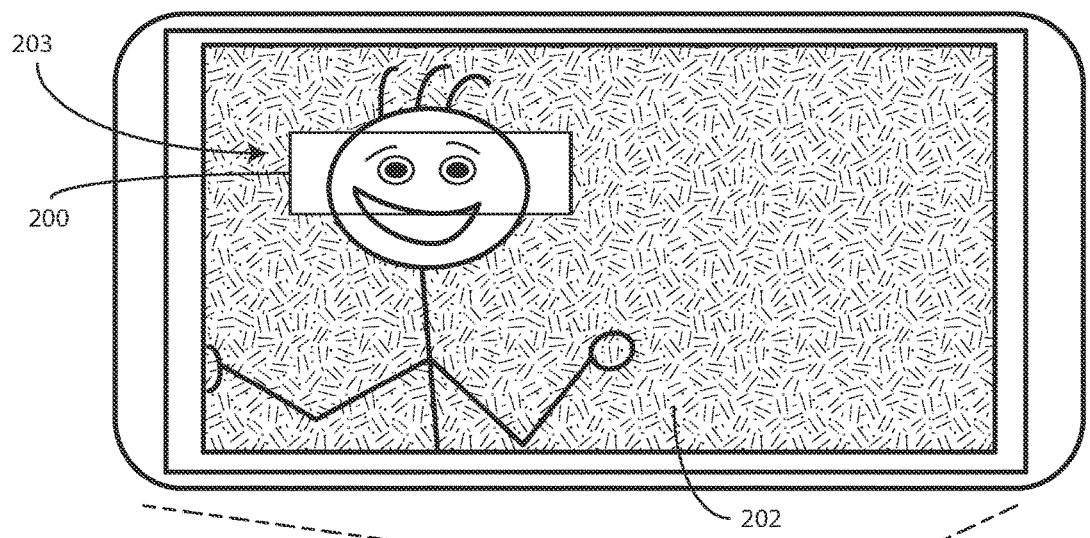
FIG. 2 illustrates portions of the conferencing system of FIG. 1 according to one or more embodiments of the disclosure.
Figure 2:
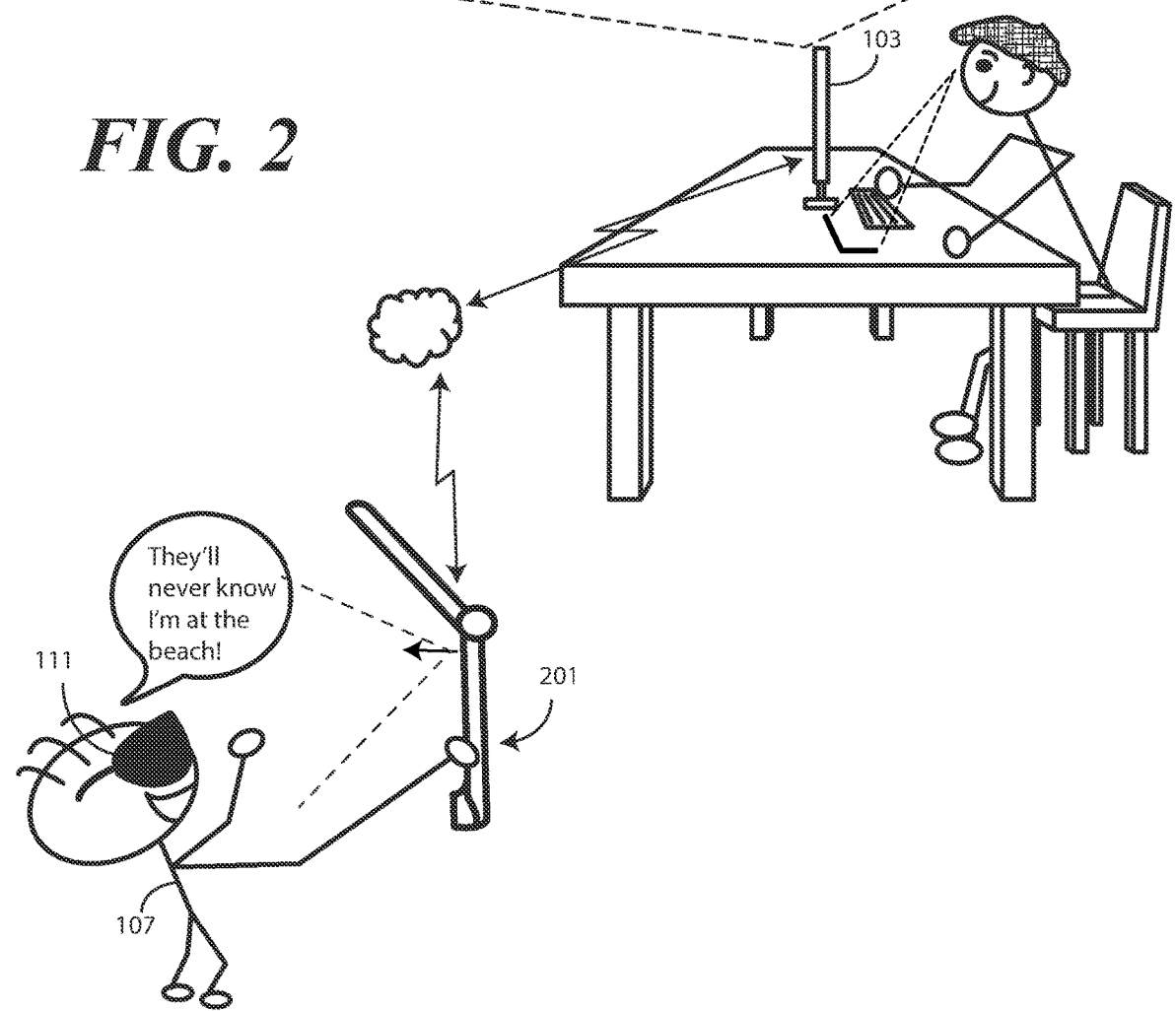

In the illustrative embodiment of FIG. 2, the one or more portions of the participant 107 that are obscured by the sunglasses 111 comprise one or more facial portions of participant 107. These facial portions include the eyes of participant 107. Accordingly, the obscured subject compensation content 200 comprises imagery depicting the eyes of participant 107. In this embodiment, the obscured subject compensation content 200 comprises computer-generated images of the eyes of the participant 107, as well as computer-generated images of the cheeks, forehead, and other portions of the participant's face that are obscured by the sunglasses 111. The obscured subject compensation content 200 is superimposed atop the images 202 as overlay indicia in this example.

By contrast, turning now to FIG. 3, in this example participant 107 is wearing an augmented reality companion device. Here, the augmented reality companion device comprises augmented reality glasses 211 equipped with an image capture device. Despite the lenses of the augmented reality glasses 211 being clear, electronics and other physical components of the augmented reality glasses 211 at least partially obscure the eyes of participant 107.

Once again, one or more processors of the conferencing system terminal device 201 apply obscured subject compensation content 300 to the images 302 of the videoconference at locations 303 where the one or more portions of the subject of the images 302 are obscured. In one or more embodiments, this application of the obscured subject compensation content 300 occurs during the videoconference and prior to the communication device of the conferencing system terminal device 201 transmitting the images 302 to the at least one remote electronic device engaged in the videoconference, here conferencing system terminal device 103.

Since the augmented reality glasses 211 are equipped with an image capture device, in this illustrative embodiment the obscured subject compensation content 300 comprises images of the eyes of participant 107 that are presently being captured by the image capture device of the augmented reality glasses 211. As shown in FIG. 3, the obscured subject compensation content 300 is presented within an outer boundary defined by the frames of the augmented reality glasses 211. Since participant 107 is making a jovial expressly, in this example the obscured subject compensation content 300 comprises depictions of this expression as expressed by participant 107 as well. While images captured by the augmented reality glasses 211 are being used as the obscured subject compensation content 300 in this example, the images could be replaced with previously captured images, animations, or computer-generated imagery as well. Turning now to FIG. 4, illustrated therein is one such example.

In this example, participant 107 is reading a book 411 while engaged in the videoconference. While a bit rude to the other participants 109, participant 107 believes he can multitask, nonetheless. As shown in FIG. 4, the book 411 is obscuring portions of the participant's face and torso. Since this obstructing object is just a book 411, it is not equipped with any image capture device.

As previously described, one or more processors of the participant's conferencing system terminal device 201 apply obscured subject compensation content 400 to the images 402 of the videoconference at locations 403 where the one or more portions of participant 107 are obscured. In one or more embodiments, the one or more processors apply this obscured subject compensation content 400 during the videoconference and prior to the communication device of the conferencing system terminal device 201 transmitting the images 402 to at least one remote electronic device engaged in the videoconference, e.g., conferencing system terminal device 103.

In the illustrative embodiment of FIG. 4, the obscured subject compensation content 400 comprises an animation depicting facial portions and torso portions of participant 107. The obscured subject compensation content 400 is superimposed atop the images 402 as overlay indicia in this example.

Figure 5:
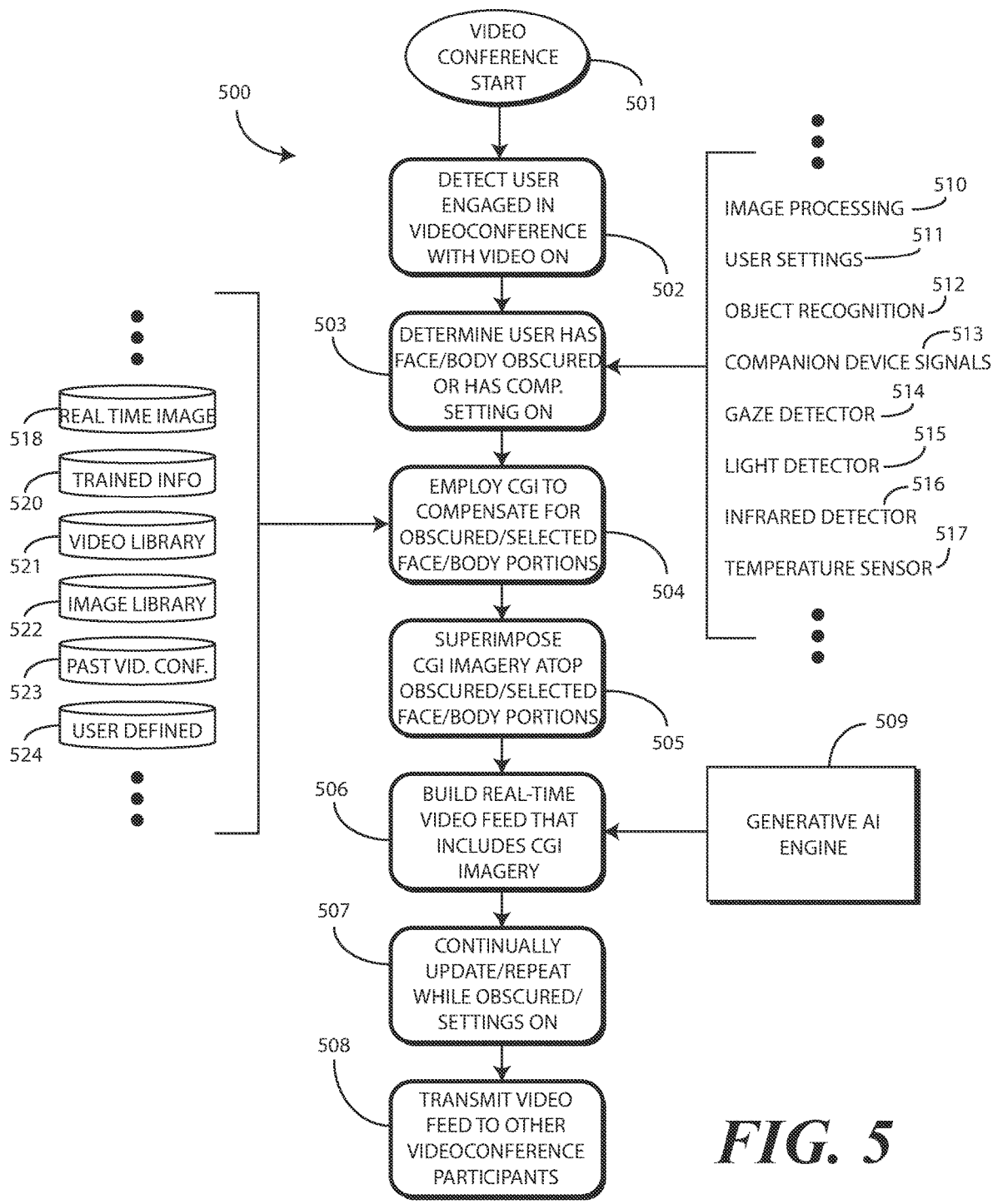
FIG. 5 illustrates one explanatory method in accordance with one or more embodiments of the disclosure.

Turning now to FIG. 5, illustrated therein is on explanatory method 500 for performing the operations described above with reference to FIGS. 1-4. Beginning at stage 501, a videoconference is initiated. In one or more embodiments, the videoconference occurs across a network, one example of which is network (105) shown in FIG. 1. In one or more embodiments, the videoconference includes one or more videoconference feeds associated therewith. These videoconference feeds can include audio content and/or video content. The features described in conjunction with the method 500 of FIG. 5 using this video content and/or audio content could be performed in a conferencing system terminal device engaged in the videoconference initiated at stage 501 or, alternatively, by a videoconferencing server complex facilitating the videoconference initiated at stage 501.

In one or more embodiments, the initiation of the videoconference at stage 501 means that image capture devices of conferencing system terminal devices engaged in the videoconference begin capturing images of subjects participating in the videoconference. A communication device of the conferencing system terminal device then transmits the images to at least one remote electronic device engaged in the videoconference, optionally in conjunction with the operations of a conferencing system server complex facilitating the videoconference. Communication devices of those remote electronic devices receive one or more videoconference feeds, each of which can include an audio feed and a video feed, depicting the one or more subjects engaged in the videoconference from the other conferencing system terminal devices engaged in the videoconference.

As will be explained in more detail below with reference to FIG. 6, in one or more embodiments each conferencing system terminal device engaged in the videoconference includes an image capture device, a communication device, one or more sensors, and one or more processors. These conferencing system terminal devices can also include an obscured subject detection engine configured to detect when a participant in the videoconference is at least partially obscured, such as when they are wearing sunglasses, wearing augmented reality glasses that partially obscure the eyes, reading a book that partially shields their face, reading a document that partially shields their face, are positioned behind another electronic device, and so forth, from the audio content and/or video content associated with the audio and video feeds of the videoconference, respectively. The conferencing system terminal devices can also be equipped with an obscured subject detection engine that monitors video or audio feeds to determine whether facial or other features of the participants are obscured during the videoconference as well. Other components that can be included with the conferencing system terminal device will be described below with reference to FIG. 6. Still others will be obvious to those of ordinary skill in the art having the benefit of this disclosure.

At step 502, one or more processors of either a conferencing system terminal device or a conferencing system server complex identify that one or more conferencing system terminal devices are engaged in the video conference with their image capture devices being operational. At step 503, the one or more processors of either the conferencing system terminal device or the conferencing system server complex identify from the one or more video feeds that one or more portions of a subject are obscured in the images of the video feed depicting the subject and captured by the image capture device of the corresponding conferencing system terminal device while the subject is engaged in the videoconference.

Step 503 can be performed in a variety of ways. In one or more embodiments, each conferencing system terminal device includes one or more sensors that determine whether one or more portions of the subject are obscured within the images. These sensors can be configured to sense or determine physical parameters indicative of conditions in an environment about a conferencing system terminal device that result in a subject being partially or entirely obscured during a videoconference.

One example of such a sensor is an intelligent imager that is configured to capture one or more images and then determine whether objects within the images match predetermined criteria using object recognition 512. For example, an intelligent imager can operate as an identification module configured with optical recognition such as include image recognition, character recognition, visual recognition, facial recognition, color recognition, shape recognition and the like. Advantageously, the intelligent imager can be used as a facial recognition device to detect the presence of a face of a subject, as well as whether that face is clearly depicted in the images captured by the intelligent imager or whether the face is at least partially obscured.

Illustrating by example, in one embodiment the intelligent imager can capture one or more photographs of a person in a video feed that constitutes part of a videoconference. The intelligent imager can then compare the images to a reference file stored in memory to confirm beyond a threshold probability that the person's face sufficiently matches the reference file and is therefore unobscured. However, if the threshold probability is not met, this can indicate that the face is at least partially obscured. Beneficially, object recognition 512 allows the one or more processors of the conferencing system terminal device or the conferencing system server complex to apply obscured subject compensation content to images at locations where the one or more portions of the subject are obscured, during the video conference, and prior to the communication device of the conferencing system terminal device or conferencing system server complex transmitting the images to the other conferencing system terminal devices engaged in the videoconference.

The intelligent imager can function in other ways as well. For example, in some embodiments the intelligent imager, when capturing multiple successive pictures, can use image processing 510 techniques to determine whether a subject's face or body becomes obscured. The intelligent imager can detect using image processing 510 to determine whether a person dons sunglasses, dons augmented reality glasses, or opens a book that partially obscures the subject's visage or other body parts.

Another type of sensor that can be included in each conferencing system terminal device is a gaze detector 514. The gaze detector 514 can comprise sensors for detecting the user's gaze point. Electronic signals can then be delivered from the sensors to a gaze detection processing engine for computing the direction of user's gaze in three-dimensional space. The gaze detector 514 can further be configured to detect a gaze cone corresponding to the detected gaze direction, which is a field of view within which the user may easily see without diverting their eyes or head from the detected gaze direction. The gaze detector 514 can be configured to alternately estimate gaze direction by inputting to the gaze detection processing engine images representing one or more photographs of a selected area near or around the eyes. Other techniques for detecting gaze will be obvious to those of ordinary skill in the art having the benefit of this disclosure.

When this gaze remains undetected, the one or more processors of the corresponding conferencing system terminal device may conclude that the eyes of that subject are obscured. In one or more embodiments, the gaze detector can optionally include sensors for detecting the alignment of a user's head in three-dimensional space. When the head is not aligned with the image capture device of the conferencing system terminal device, the one or more processors can apply obscured subject compensation content to make it look as if the subject is looking directly into the camera, thereby simulating the subject making direct eye contact with the other participants of the videoconference.

A light sensor 515 can detect changes in optical intensity, color, light, or shadows in the video feed to determine, for example, whether a subject is wearing sunglasses. For example, if the light sensor 515 detects low-light conditions in the middle of a subject's visage, this can be an indicator that sunglasses are being worn. An infrared sensor 516 can be used in conjunction with, or in place of, the light sensor 515 to detect zones of a subject that are not emitting as much infrared emissions as are other portions. Again, this can be indicative of an object, be it sunglasses, a document, a computer, augmented reality glasses, or another object being positioned between the subject and image capture device and blocking infrared emissions. Similarly, a temperature sensor 517 can be configured to monitor temperature about an electronic device.

In still other embodiments, a user can manually cause the one or more processors to apply the obscured subject compensation content using user settings 511 configured in a menu or control panel of the electronic device. Where the subject is wearing a companion device, such as an augmented reality companion device configured as augmented reality glasses, this augmented reality companion device can transmit electronic signals 513 to the conferencing system terminal device alerting the one or more processors of the conferencing system terminal device that the augmented reality companion device is active and is likely obscuring the eyes or other portions of the subject. These techniques for detecting partially obscured portions of a subject are illustrative only. Others will be obvious to those of ordinary skill in the art having the benefit of this disclosure.

At step 504, the one or more processors of either a conferencing system terminal device or a conferencing system server complex generate obscured subject compensation content to compensate for the obscured portions of the images of the subject that, when applied to those images at step 505, will transform the obscured images of the subject to less obscured images of the subject. In one or more embodiments, step 504 comprises generating the obscured subject compensation content in real time. The obscured subject compensation content can be generated in a variety of ways at step 504.

In one or more embodiments, real time images 518 can be used to generate the obscured subject compensation content. Illustrating by example, if the subject is obscured by a companion device having image capture capabilities as was the case described above with reference to FIG. 2, the obscured subject compensation content can be generated from those real time images 518. If the subject is wearing an augmented reality companion device such as augmented reality glasses that are capable of capturing real time images 518 of the user's eyes, those real time images 518 can be used to construct the obscured subject compensation content. Thus, in one or more embodiments when the subject is wearing eyewear comprising at least one imager capturing imagery of the eyes of the subject, the real time images 518 can comprise depictions of the eyes of the subject generated from the imagery of the eyes of the subject captured by at least one the imager.

In other embodiments, the obscured subject compensation content can comprise an animation 519 of the portions of the subject that are obscured. One example of this was described above with reference to FIG. 4.

In still other embodiments, the obscured subject compensation content can be generated from training information 520. The owner of a conferencing system terminal device can deliver training information to the conferencing system terminal device by capturing pictures of their visage and/or other body parts from different angles, with this training information 520 being synthesized in a computer-generated imagery engine to create the obscured subject compensation content. In one or more embodiments, the obscured subject compensation content can comprise deep fake imagery generated by computer-generated image techniques from the training information 520, and so forth.

In other embodiments, the one or more processors can employ a computer-generated imagery engine that draws from videos or images of the subject stored in a video library 521 or an image library 522. Stored video feeds 523 from previous videoconferences can be delivered to a computer-generated imagery engine to generate the obscured subject compensation content as well.

In still other embodiments, user defined data 524 can be used to generate the obscured subject compensation content. Illustrating by example, if a user is wearing sunglasses, to be witty perhaps they want to superimpose the eyes of a raccoon atop their eyes during the videoconference. Accordingly, the user defined data 524 can define such avatar portions or other user defined information suitable for constructing the obscured subject compensation content. These sources from which obscured subject compensation content can be constructed are illustrative only, as numerous others will be obvious to those of ordinary skill in the art having the benefit of this disclosure.

At step 505, the one or more processors of either the conferencing system terminal device or the conferencing system server complex apply the obscured subject compensation content to portions of the images of the video feeds of the videoconference at portions of those images corresponding to the one or more portions of the subject that are obscured to create less obscured images of the subject.

In one or more embodiments, step 505 comprises one or more processors of a conferencing system terminal device or the conferencing system server complex generating and automatically applying the obscured subject compensation content in the images associated with one or more video feeds of the videoconference at portions of those images corresponding to one or more portions of the subject that are obscured to create less obscured images. For example, the one or more processors may automatically apply the obscured subject compensation content atop the obscured portions of the subject appearing the images associated with one or more video feeds of the videoconference at step 505. In one or more embodiments, the generation of step 504 and automatic application occurring at step 505 occurs prior to the communication device of the conferencing system terminal device transmitting the images to other conferencing system terminal devices engaged in the videoconference.

In one or more embodiments, step 505 comprises the one or more processors of the conferencing system terminal device or the conferencing system server complex automatically applying the obscured subject compensation content in the form of overlay indicia that is superimposed atop portions of the images of the subject corresponding to the portions of the subject that are obscured. For example, in one or more embodiments when the obscured portions of the subject are due to the fact that the subject is wearing eyewear, step 505 can comprise superimposing depictions of the eyes at portions of the images where the eyes are obstructed. In one or more embodiments, this superimposition can occur within the frames of the eyewear, as previously described.

In one or more embodiments, step 505 superimposes the obscured subject compensation content in this manner in real time during the videoconference. Since the application of the obscured subject compensation content occurs in real time, step 505 can include stopping its application when no longer needed as well. Illustrating by example, where step 503 determines that the subject is no longer partially obscured, step 505 can comprise ceasing the application of the obscured subject compensation content. Thus, if a subject was initially wearing eyewear, as detected at step 503, with step 505 applying obscured subject compensation content to compensate for these obstructed portions of the subject, when the subject removes the eyewear, again detected at step 503, step 505 can comprise ceasing the application of the obscured subject compensation content, and so forth.

The one or more processors of the conferencing system terminal device and/or conferencing system server complex may optionally employ a generative artificial intelligence engine 509 to create the less obstructed video feed at step 506. In one or more embodiments, one or both of the conferencing system terminal devices engaged in the videoconference initiated at stage 501 and/or the conferencing system server complex facilitating the videoconference initiated at stage 501 are equipped with a generative artificial intelligence engine 509 that includes an artificial neural network or other similar technology that detects obscured portions of a subject and applies the obscured subject compensation content upon depictions of the one or more portions of the face of the subject in one or more videoconference feeds to create one or more less obscured videoconference feeds to be used with the videoconference initiated at stage 501.

At step 507, the method 500 can repeat. Illustrating by example, step 507 can comprise the one or more processors of one or both of the conferencing system terminal devices engaged in the videoconference initiated at stage 501 and/or the conferencing system server complex facilitating the videoconference initiated at stage 501 changing the obscured subject compensation content when the portions of a subject that are obscured change. Step 507 can comprise the obscured subject compensation content being generated, and then re-generated, in real time as a function of which portions of the subject are detected as being obscured at step 503. Thus, the presentation of one the obscured subject compensation content can dynamically change as the videoconference initiated at stage 501 proceeds to continually, and automatically, create more engaged communications between the videoconference participants.

At step 508, the one or more processors of the conferencing system terminal device or conferencing system server complex cause a communication device to transmit the less obscured images of the subject across a network to another conferencing system terminal device engaged in the videoconference. Of course, the method 500 can be used with multiple participants engaged in a videoconference as well. Thus, of two or more participants are each wearing sunglasses, the one or more processors of the conferencing system terminal device or conferencing system server complex can generate a plurality of obscured subject compensation content for each videoconference feed in which a corresponding subject's face is at least partially obscured.

Figure 6:
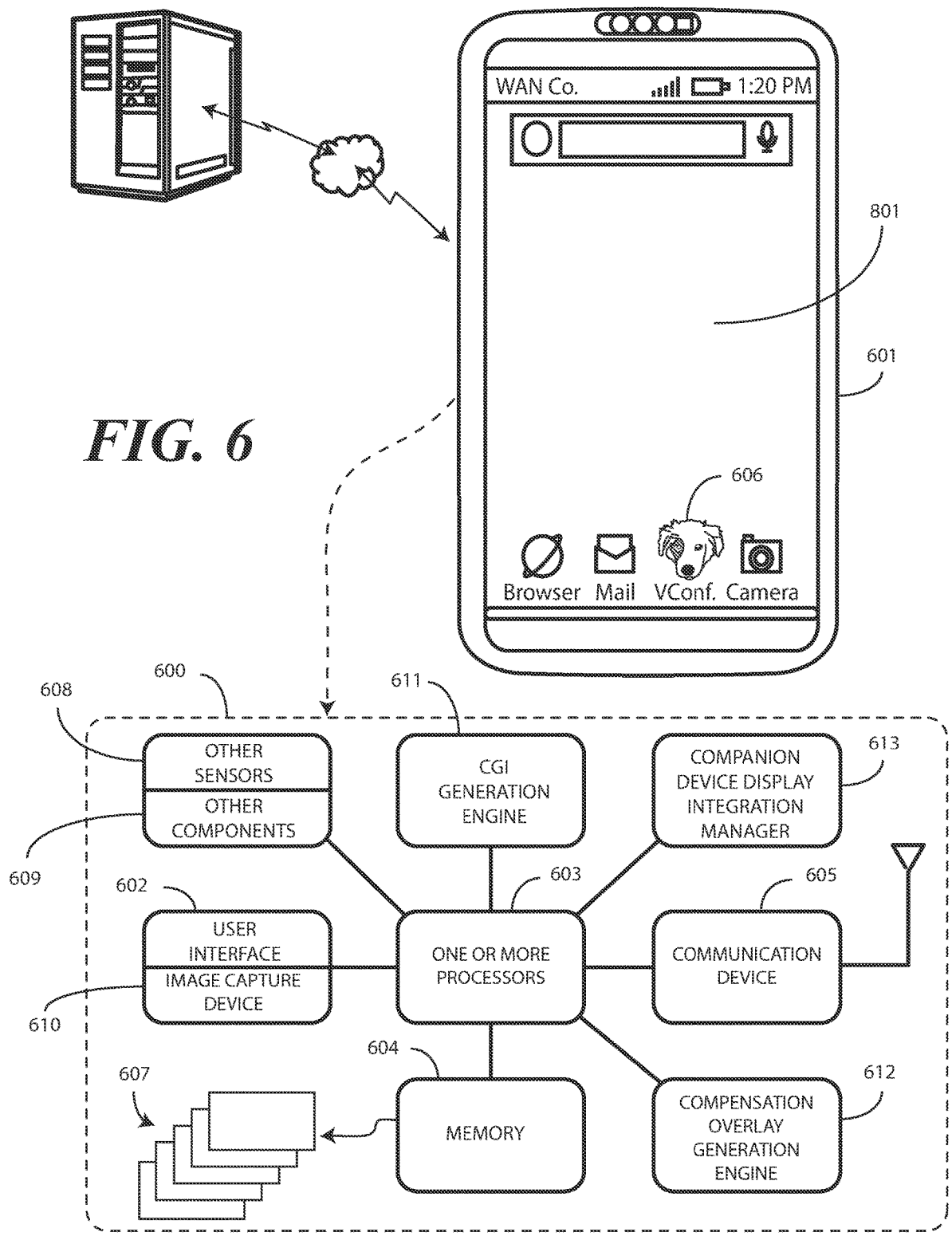
FIG. 6 illustrates one explanatory conferencing system terminal device in accordance with one or more embodiments of the disclosure.

Turning now to FIG. 6, illustrated therein is one explanatory conferencing system terminal device 101. The conferencing system terminal device 101 of FIG. 6 is a portable electronic device. For illustrative purposes, the conferencing system terminal device 101 is shown as a smartphone. However, the conferencing system terminal device 101 could be any number of other devices as well, including tablet computers, desktop computers, notebook computers, and so forth. Still other types of conferencing system terminal devices can be configured in accordance with one or more embodiments of the disclosure as will be readily appreciated by those of ordinary skill in the art having the benefit of this disclosure.

This illustrative conferencing system terminal device 101 includes a display 601, which may optionally be touch-sensitive. In one embodiment where the display 601 is touch-sensitive, the display 601 can serve as a primary user interface 602 of the conferencing system terminal device 101. Users can deliver user input to the display 601 of such an embodiment by delivering touch input from a finger, stylus, or other objects disposed proximately with the display 601.

In one embodiment, the display 601 is configured as an active-matrix organic light emitting diode (AMOLED) display. However, it should be noted that other types of displays, including liquid crystal displays, would be obvious to those of ordinary skill in the art having the benefit of this disclosure. Where the conferencing system terminal device 101 is configured with a keyboard and/or mouse, such as when the conferencing system terminal device 101 is configured as a computer, the keyboard and/or mouse can serve as the primary user interface 602.

A block diagram schematic 600 of the conferencing system terminal device 101 is also shown in FIG. 6. The block diagram schematic 600 can be configured as a printed circuit board assembly disposed within the device housing of the conferencing system terminal device 101. Various components can be electrically coupled together by conductors or a bus disposed along one or more printed circuit boards.

In one or more embodiments, the conferencing system terminal device 101 includes one or more processors 603. In one embodiment, the one or more processors 603 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the conferencing system terminal device 101. Each of the application processor and the auxiliary processor(s) can be configured to process and execute executable software code to perform the various functions of the conferencing system terminal device 101. A storage device, such as memory 604, can optionally store the executable software code used by the one or more processors 603 during operation.

The conferencing system terminal device 101 also includes a communication device 605 that can be configured for wired or wireless communication with one or more other devices or networks. The networks can include a wide area network, a local area network, and/or personal area network. The communication device 605 may also utilize wireless technology for communication, such as, but are not limited to, peer-to-peer or ad hoc communications such as HomeRF, Bluetooth and IEEE 802.11, and other forms of wireless communication such as infrared technology. The communication device 605 can include wireless communication circuitry, one of a receiver, a transmitter, or transceiver, and one or more antennas.

In one embodiment, the one or more processors 603 can be responsible for performing the primary functions of the conferencing system terminal device 101. For example, in one embodiment the one or more processors 603 comprise one or more circuits operable with one or more user interface devices, which can include the display 601, to engage in videoconferences by transmitting, receiving, and presenting images, video, or other presentation information. The executable software code used by the one or more processors 603, including that associated with a videoconference application 606, can be configured as one or more modules 607 that are operable with the one or more processors 603. Such modules 607 can store instructions, control algorithms, logic steps, and so forth.

In one embodiment, the one or more processors 603 are responsible for running the operating system environment of the conferencing system terminal device 101. The operating system environment can include a kernel and one or more drivers, and an application service layer, and an application layer. The operating system environment can be configured as executable code operating on one or more processors or control circuits of the conferencing system terminal device 101. The application layer can be responsible for executing application service modules. The application service modules may support one or more applications or "apps," such as the videoconference application 606. The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In one embodiment, the one or more processors 603 may generate commands or execute control operations based upon user input received at the user interface 602. Moreover, the one or more processors 603 may process the received information alone or in combination with other data, such as the information stored in the memory 604.

The conferencing system terminal device 101 can include one or more sensors 608. The one or more sensors 608 may include a microphone, any of the sensors described above with reference to FIG. 5, an earpiece speaker, and/or a second loudspeaker. The one or more other sensors 608 may also include touch actuator selection sensors, proximity sensors, a touch pad sensor, a touch screen sensor, a capacitive touch sensor, and one or more switches. Touch sensors may used to indicate whether any of the user actuation targets present on the display 601, including the audio difficulties user actuation targets described above, are being actuated. The other sensors 608 can also include audio sensors and video sensors (such as a camera).

Other components 609 operable with the one or more processors 603 can include output components such as video outputs, audio outputs, and/or mechanical outputs. Examples of output components include audio outputs such as speaker port, earpiece speaker, or other alarms and/or buzzers and/or a mechanical output component such as vibrating or motion-based mechanisms. Still other components will be obvious to those of ordinary skill in the art having the benefit of this disclosure.

The other components 609 can also include an image processor. The image processor can include hardware, executable code, and image processing executable code in one embodiment. The image processor can include, stored in memory 604, basic image models, trained image models, or other modules that are used by the image processor to determine whether images captured by the imager include portions depicting obscured portions of a subject depicted in those images. In one embodiment, the image processor can include an object recognition engine. Regardless of the specific implementation utilized in the various embodiments, the image processor can access various image models to determine whether a face of a subject in one or more image or video feeds are obscured in one or more embodiments.

To capture video during a videoconference, in one or more embodiments the conferencing system terminal device 101 includes an imager 610 or another image capture device. The conferencing system terminal device 101 can optionally include a depth imager as well.

In one embodiment, the imager 610 comprises a two-dimensional imager configured to receive at least one image of a person within an environment of the conferencing system terminal device 101. In one embodiment, the imager 610 comprises a two-dimensional RGB imager. In another embodiment, the imager 610 comprises an infrared imager. Other types of imagers suitable for use as the imager 610 of the conferencing system terminal device 101 will be obvious to those of ordinary skill in the art having the benefit of this disclosure.

In one or more embodiments, the conferencing system terminal device 101 includes a obscured subject compensation content generation engine 611. The obscured subject compensation content generation engine 611 can generate obscured subject compensation content as described above with reference to FIG. 5. Illustrating by example, the obscured subject compensation content generation engine 611 can include a generative artificial intelligence manager that creates obscured subject compensation content from real time images, in the form of animations, from training information, video libraries, image libraries, video captured during past videoconferences, or from user defined information. The obscured subject compensation content generation engine 611 can employ an artificial neural network or other similar technology that detects obscured portions of a subject and generates obscured subject compensation content that, when applied to the images, creates less obscured depictions of the subject.

The conferencing system terminal device 101 can also include an obscured subject compensation content overlay engine 612 that applies the obscured subject compensation content generated by the obscured subject compensation content generation engine 611 upon depictions of one or more portions of a subject that are obscured to create one or more less obscured videoconference images suitable for delivery by the communication device 605 to one or more remote electronic devices or conferencing system terminal devices during a videoconference.

As with the obscured subject compensation content generation engine 611, the obscured subject compensation content overlay engine 612 can be operable with the one or more processors 603. In some embodiments, the one or more processors 603 can control the obscured subject compensation content overlay engine 612. In other embodiments, the obscured subject compensation content overlay engine 612 can operate independently, sensing obscured subject information from the one or more sensors 608 and/or receiving obscured subject compensation content generated by the obscured subject compensation content generation engine 611. The obscured subject compensation content overlay engine 612 can receive data from the various sensors. In one or more embodiments, the one or more processors 603 are configured to perform the operations of the obscured subject compensation content overlay engine 612.

In one or more embodiments, the obscured subject compensation content overlay engine 612 automatically applies obscured subject compensation content to images of a video feed of a videoconference. In one or more embodiments, the obscured subject compensation content overlay engine 612 automatically applies the obscured subject compensation content atop obscured portions of the subject of the images during the videoconference. In one or more embodiments, the obscured subject compensation content overlay engine 612 automatically applies the obscured subject compensation content prior to the communication device 605 transmitting the images to other conferencing system terminal devices participating in the videoconference. Thereafter, the communication device 605 can transmit the (now) less obscured modified images to other conferencing system terminal devices engaged in the videoconference. In other embodiments, the obscured subject compensation content overlay engine 612 applies the obscured subject compensation content to images received from other conferencing system terminal devices participating in the videoconference when those images depict portions of a subject that are at least partially obscured.

The display 601 can then present the modified videoconference feed after the obscured subject compensation content is applied. The obscured subject compensation content overlay engine 612 can apply an overlay generated by the obscured subject compensation content generation engine 611 to portions of images in the video feed depicting obscured portions of a subject to create less obscured images of the subject. Alternatively, the obscured subject compensation content overlay engine 612 can superimpose the obscured subject compensation content atop the subject as illustrated above in FIGS. 2 and 4.

The obscured subject compensation content overlay engine 612 can be operable with the various sensors 608 to detect, infer, capture, and otherwise determine portions of the subject that are obscured within an environment about the conferencing system terminal device 101. For example, where included one embodiment of the obscured subject compensation content overlay engine 612 determines assessed contexts and frameworks using adjustable algorithms of context assessment employing information, data, and events. These assessments may be learned through repetitive data analysis. These assessments can be used to obtain additional contextual information when the contextual information changes in one or more embodiments. The obscured subject compensation content overlay engine 612 can comprise an artificial neural network or other similar technology in one or more embodiments.

In one or more embodiments, the conferencing system terminal device 101 includes a companion device display integration manager 613. The companion device display integration manager 613 can be used to communicate with a companion electronic device, one example of which is the augmented reality companion device of FIG. 2. The conferencing system terminal device 101 can operate as a stand-alone electronic device in one or more embodiments. However, in other embodiments, the conferencing system terminal device 101 can operate in tandem with a content presentation companion device and/or augmented reality companion device via wireless electronic communication using the communication device 605.

It is to be understood that FIG. 6 is provided for illustrative purposes only and for illustrating components of one conferencing system terminal device 101 in accordance with embodiments of the disclosure and is not intended to be a complete schematic diagram of the various components required for a conferencing system terminal device. Therefore, other conferencing system terminal devices in accordance with embodiments of the disclosure may include various other components not shown in FIG. 6 or may include a combination of two or more components or a division of a particular component into two or more separate components, and still be within the scope of the present disclosure.

Figure 7:
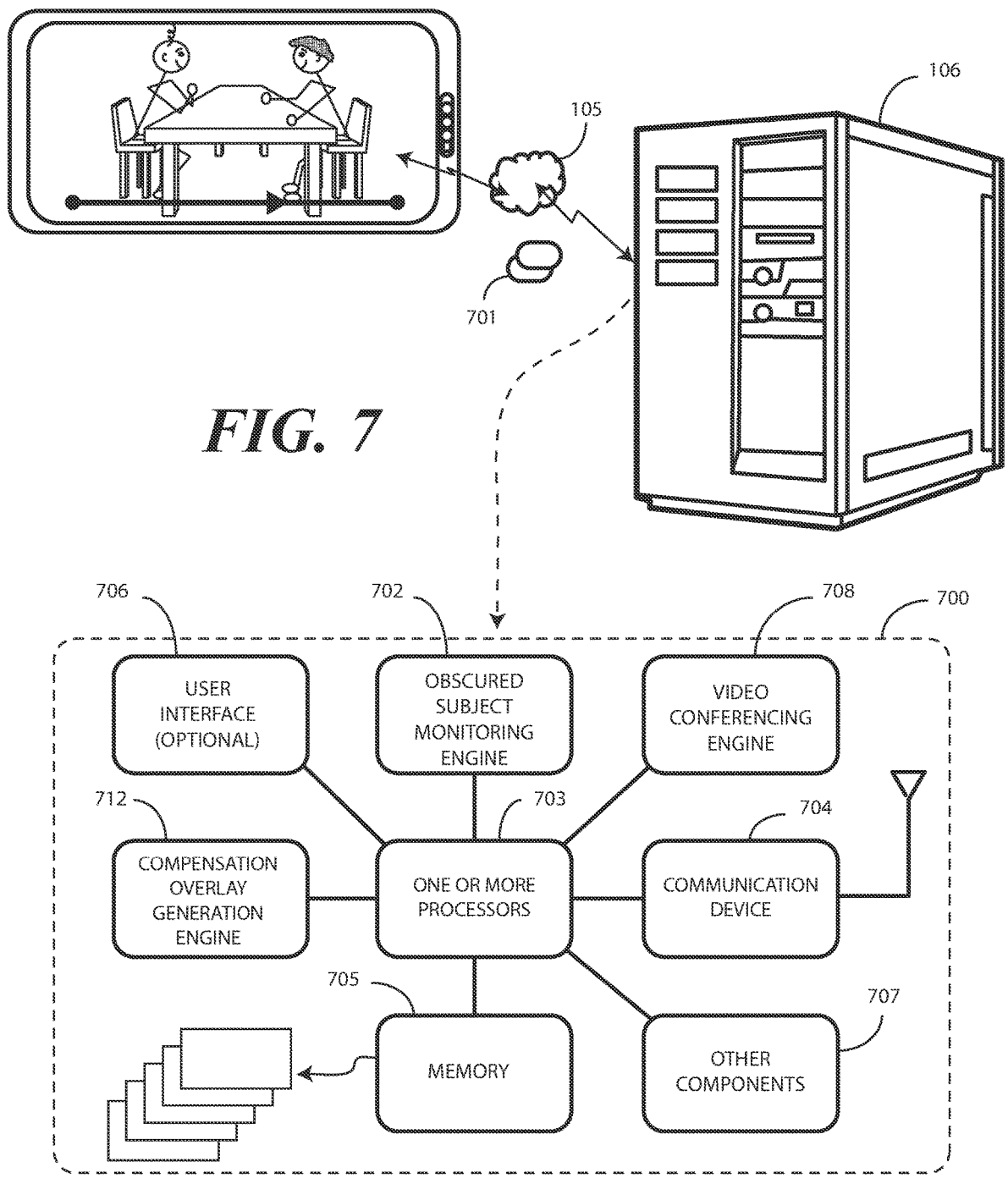
FIG. 7 illustrates one explanatory conferencing system server complex in accordance with one or more embodiments of the disclosure.

Turning now to FIG. 7, illustrated therein is one explanatory video conferencing system server complex 106 configured in accordance with one or more embodiments of the disclosure. An illustrative schematic block diagram 700 is also shown in FIG. 7.

As with the block diagram schematic (600) of FIG. 6, it is to be understood that the schematic block diagram 700 of FIG. 7 is provided for illustrative purposes only and for illustrating components of one explanatory conferencing system server complex 106 configured in accordance with one or more embodiments of the disclosure. Accordingly, the components shown in either FIG. 6 or FIG. 7 are not intended to be complete schematic diagrams of the various components required for a particular device, as other devices configured in accordance with embodiments of the disclosure may include various other components not shown in FIG. 6 or FIG. 7. Alternatively, other server complexes or conferencing system terminal devices configured in accordance with embodiments of the disclosure or may include a combination of two or more components or a division of a particular component into two or more separate components, and still be within the scope of the present disclosure.

In one or more embodiments the conferencing system server complex 106 can be configured with performing processor-intensive methods, operations, steps, functions, or procedures associated with the presentation, actuation, and management of dynamic, automatic, and real time video obscured subject compensation content during a videoconference. Illustrating by example, the conferencing system server complex 106 can be configured to receive one or more images 701 in a video feed of a videoconference across a network 105.

An obscured subject monitoring engine 702 can then monitor the received images 701 to determine whether any portions of a subject depicted in the received images 701 is obscured. One or more processors 703 of the conferencing system server complex 106 can then generate obscured subject compensation content in the form of overlays or other overlay indicia to apply to the received images 701 to create less obscured images. The one or more processors 703 can then apply the overlay or overlay indicia to a videoconference feed to create the less obscured images, which are delivered as videoconference content to the conferencing system terminal devices participating in the videoconference by the communication device 704 of the conferencing system server complex 106.

In one or more embodiments, the conferencing system server complex 106 includes one or more memory devices 705, and one or more user interface devices 706, e.g., a display, a keyboard, a mouse, audio input devices, audio output devices, and alternate visual output devices. The conferencing system server complex 106 also includes a communication device 704. These components can be operatively coupled together such that, for example, the one or more processors 703 are operable with the one or more memory devices 705, the one or more user interface devices 706, the communication device 7904, and/or other components 707 of the conferencing system server complex 106 in one or more embodiments.

The one or more processors 703 can include a microprocessor, a group of processing components, one or more ASICs, programmable logic, or other type of processing device. The one or more processors 703 can be configured to process and execute executable software code to perform the various functions of the conferencing system server complex 106.

The one or more memory devices 705 can optionally store the executable software code used by the one or more processors 703 in carrying out the operations of the videoconference system. The one or more memory devices 705 may include either or both of static and dynamic memory components. The one or more memory devices 705 can store both embedded software code and user data.

In one or more embodiments, the one or more processors 703 can define one or more process engines. For instance, the software code stored within the one or more memory devices 705 can embody program instructions and methods to operate the various functions of the conferencing system server complex 106, and also to execute software or firmware applications and modules such as the obscured subject compensation content overlay engine 712 and a video conferencing engine 708. Where included, the process engines can be configured to perform obscured subject compensation content overlay indicia generation and application operations as previously described.

Figure 8:
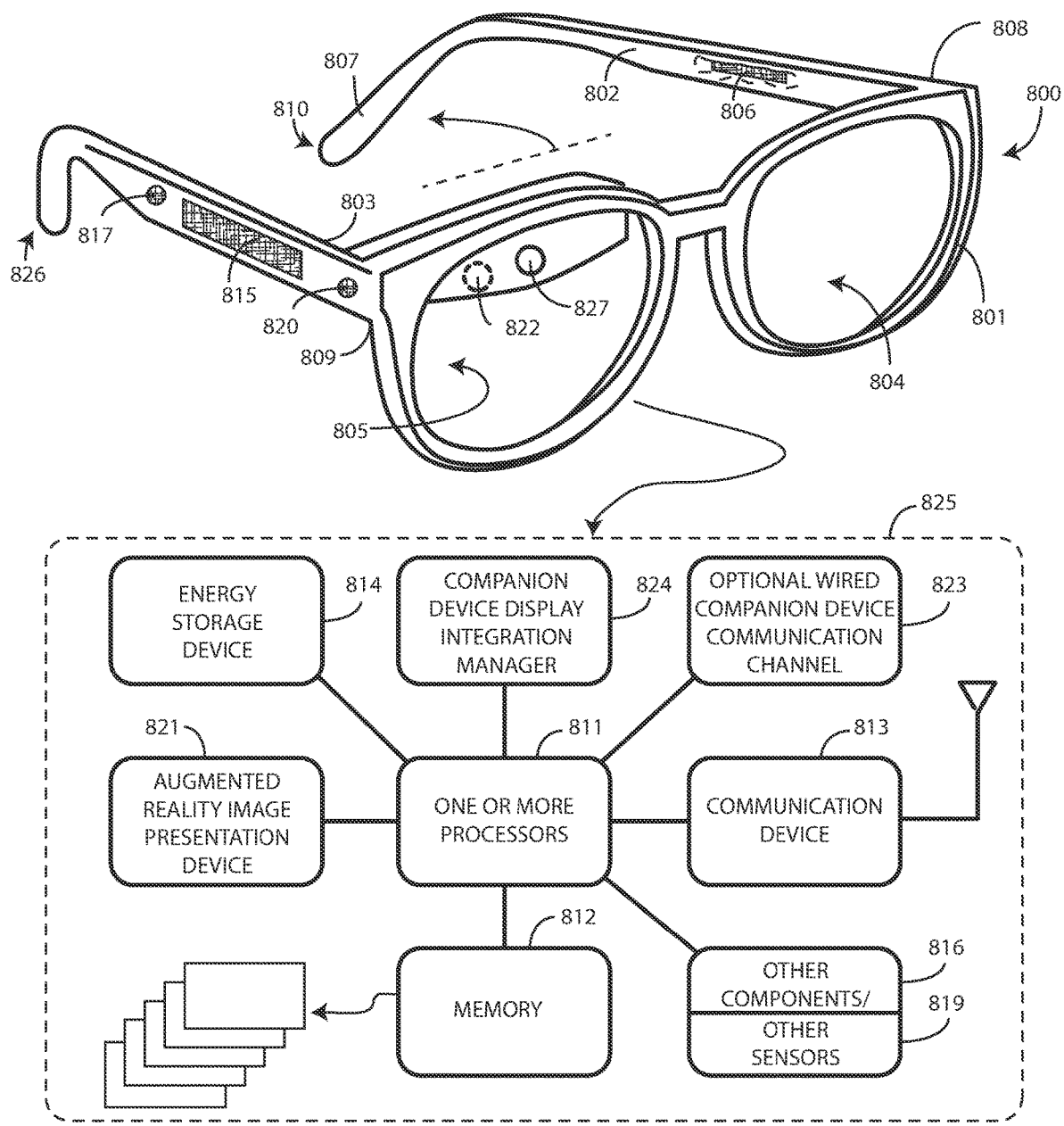
FIG. 8 illustrates one explanatory augmented reality companion device in accordance with one or more embodiments of the disclosure.

Turning now to FIG. 8, illustrated therein is one explanatory augmented reality companion device 800 configured for use in applications such as that shown in FIG. 3 above. In the illustrative embodiment of FIG. 8, the augmented reality companion device 800 comprises augmented reality glasses. However, this is for explanatory purposes only, as the augmented reality companion device 800 could be configured in any number of other ways as well. Illustrating by example, the augmented reality companion device 800 could also be configured as any of sunglasses, goggles, masks, shields, or visors. Other forms of the augmented reality companion device 800 will be obvious to those of ordinary skill in the art having the benefit of this disclosure.

The augmented reality companion device 800 of FIG. 8 includes a frame 801 and one or more stems 802,803. Here, the one or more stems 802,803 comprise a first stem 802 and a second stem 803. One or more lenses 804,805 can be disposed within the frame 801. The lenses 804,805 can be prescription or non-prescription, and can be clear, tinted, or dark.

In one or more embodiments the stems 802,803 are pivotable from a first position where they are situated adjacent to, and parallel with, the frame 801, to a second, radially displaced open position shown in FIG. 8. However, in other embodiments the stems 802,803 may be fixed relative to the frame 801. In still other embodiments, such as might be the case if the augmented reality companion device 800 were configured as goggles, the stems 802,803 may be flexible or soft. For example, the stems of goggles are frequently elasticized fabric, which is soft, flexible, pliable, and stretchy. Other types of stems 802,803 will be obvious to those of ordinary skill in the art having the benefit of this disclosure.

In one or more embodiments the stems 802,803 attach to the frame 801 at a first end 808,809 and extend distally from the frame 801 to a second, distal end 810,826. In one embodiment, each stem 802,803 includes a temple portion 806 and an ear engagement portion 807. The temple portion 806 is the portion of the stem 802,803 passing from the frame 801 past the temple of a wearer, while the ear engagement portion 807 engages the wearer's ear to retain the augmented reality glasses to the wearer's head.

Since the augmented reality companion device 800 is configured as an electronic device, one or both of the frame 801 and the stems 802,803 can comprise one or more electrical components. It is these electrical components that can sometimes obscure the eyes of a wearer, as the housings they are situated in can partially block the eyes of a wearer from being captured by an image capture device during a videoconference.

These electrical components are shown illustratively in a schematic block diagram 825 in FIG. 8. It will be clear to those of ordinary skill in the art having the benefit of this disclosure that the electrical components and associated modules can be used in different combinations, with some components and modules included and others omitted. Components or modules can be included or excluded based upon need or application.

The electronic components can include one or more processors 811. The one or more processors 811 can be disposed in one or both of the stems 802,803 or the frame 801. The one or more processors 811 can be operable with a memory 812. The one or more processors 811, which may be any of one or more microprocessors, programmable logic, application specific integrated circuit device, or other similar device, are capable of executing program instructions and methods described herein. The program instructions and methods may be stored either on-board in the one or more processors 811, or in the memory 812, or in other computer readable media coupled to the one or more processors 811.

The one or more processors 811 can be configured to operate the various functions of the augmented reality companion device 800, and also to execute software or firmware applications and modules that can be stored in a computer readable medium, such as memory 812. The one or more processors 811 execute this software or firmware, in part, to provide device functionality. The memory 812 may include either or both static and dynamic memory components, may be used for storing both embedded code and user data.

In one or more embodiments, the augmented reality companion device 800 also includes an optional wireless communication device 813. Where included, the wireless communication device 813 is operable with the one or more processors 811 and is used to facilitate electronic communication with one or more electronic devices or servers or other communication devices across a network. Note that it is possible to combine the one or more processors 811, the memory 812, and the wireless communication device 813 into a single device, or alternatively into devices having fewer parts while retaining the functionality of the constituent parts.

The wireless communication device 813, which may be one of a receiver or transmitter and may alternatively be a transceiver, operates in conjunction with the one or more processors 811 to electronically communicate through a communication network. For example, in one embodiment, the wireless communication device 813 can be configured to communicate through a traditional cellular network. Other examples of networks with which the communication circuit may communicate include proprietary networks and direct communication networks. In other embodiments, the wireless communication device 813 can communicate with near field or local area networks, infrared communication circuits, magnetic field modulation circuits, and Wi-Fi circuits. In one or more embodiments, the wireless communication device 813 can be configured to provide messaging functionality to deliver electronic messages to remote devices.

A battery 814 or other energy storage device can be included to provide power for the various components of the augmented reality companion device 800. While a battery 814 is shown in FIG. 8, it will be obvious to those of ordinary skill in the art having the benefit of this disclosure that other energy storage devices can be used instead of the battery 814, including a micro fuel cell or an electrochemical capacitor. The battery 814 can include a lithium-ion cell, lithium polymer cell, or a nickel metal hydride cell, such cells having sufficient energy capacity, wide operating temperature range, large number of charging cycles, and long useful life. The battery 814 may also include overvoltage and overcurrent protection and charging circuitry. In one embodiment, the battery 814 comprises a small, lithium polymer cell.

In one or more embodiments, a photovoltaic device 815, such as a solar cell, can be included to recharge the battery 814. In one embodiment, the photovoltaic device 815 can be disposed along the temple portion 806 of the stems 802,803. In this illustrative embodiment, two solar cells are disposed in the temple portion 806 of each stem 802,803, respectively.

Other components 816 can be optionally included in the augmented reality companion device 800 as well. For example, in one embodiment one or more microphones can be included as audio capture devices 817. These audio capture devices can be operable with the one or more processors 811 to receive voice input. Additionally, in one or more embodiments the audio capture devices 817 can capture ambient audio noise. Signals corresponding to captured audio can be transmitted to an electronic device in communication with the augmented reality companion device 800 or a server or cloud-computing device. The other component 816 can additionally include loudspeakers for delivering audio content to a user wearing the augmented reality companion device 800.

The other components 816 can also include a motion generation device for providing haptic notifications or vibration notifications to a user. For example, a piezoelectric transducer, rotational motor, or other electromechanical device can be configured to impart a force or vibration upon the temple portion 806 of the stems 802,803, or alternatively along the frame 801. The motion generation device can provide a thump, bump, vibration, or other physical sensation to the user. The one or more processors 811 can be configured to actuate the motion generation device to deliver a tactile or vibration output alone or in combination with other outputs such as audible outputs.

Similarly, in one or more embodiments the augmented reality companion device 800 can include a video capture device 827 such as an imager. The imager can be disposed within the frame 801 or stems 802,803. In one or more embodiments, the video capture device 827 can function as a to detect changes in optical intensity, color, light, or shadow in the near vicinity of the augmented reality companion device 800. As with the audio capture device 817, captured video information can be transmitted to an electronic device, a remote server, or cloud-computing device.

Other sensors 819 can be optionally included in the augmented reality companion device 800. One example of such a sensor is a global positioning system device for determining where the augmented reality companion device 800 is located. The global positioning system device can communicate with a constellation of earth orbiting satellites or a network of terrestrial base stations to determine an approximate location. While a global positioning system device is one example of a location determination module, it will be clear to those of ordinary skill in the art having the benefit of this disclosure that other location determination devices, such as electronic compasses or gyroscopes, could be used as well.

The other sensors 819 can also include an optional user interface. The user interface can be used, for example, to activate the circuit components or turn them OFF, control sensitivity of the other sensors 819, receive user input, and so forth. The user interface, where included, can be operable with the one or more processors 811 to deliver information to, and receive information from, a user. The user interface can include a rocker switch, slider pad, button, touch-sensitive surface, or other controls, and optionally a voice command interface. These various components can be integrated together.

In one or more embodiments, an audio output device 820, such as a loudspeaker or other transducer, can deliver audio output to a user. For example, piezoelectric transducers can be operably disposed within the stems 802,803. Actuation of the piezoelectric transducers can cause the stems 802,803 to vibrate, thereby emitting acoustic output. More traditional audio output devices 820, such as loudspeakers, can be used as well.

The other components 816 can optionally include a haptic device providing haptic feedback to a user. The haptic device can include a motion generation device to deliver a tactile response to the user. For example, a piezoelectric transducer or other electromechanical device can be included in the stems 802,803. The transducer can actuate to impart a force upon the user's head to provide a thump, bump, vibration, or other physical sensation to the user. The inclusion of both the audio output device 820 and the haptic device allows both audible and tactile feedback to be delivered.

In one or more embodiments, the augmented reality companion device 800 includes an augmented reality image presentation device 821 operable to deliver augmented reality imagery to a user. The augmented reality image presentation device 821 can be operable with a projector 822. In the illustrative embodiment of FIG. 8, the frame 801 supports the projector 822. In one or more embodiments the projector 822 is configured to deliver images to a holographic optical element when the augmented reality companion device 800 is operating in an augmented reality mode of operation.

In one embodiment, the projector 822 is a modulated light projector operable to project modulated light images along a surface or holographic optical element. In another embodiment, the projector 822 is a thin micro projector. In another embodiment, the projector 822 can comprise a laser projector display module. Other types of projectors will be obvious to those of ordinary skill in the art having the benefit of this disclosure.

In one or more embodiments, the projector 822 can include a lens and a spatial light modulator configured to manipulate light to produce images. The projector 822 can include a light source, such as a single white light emitting diode, multiple separate color light emitting diodes, or multiple separate color laser diodes that deliver visible light to the spatial light modulator through a color combiner. The augmented reality image presentation device 821 can drive the spatial light modulator to modulate the light to produce images. The spatial light modulator can be optically coupled (e.g., by free space propagation) to the lens and/or a beam steerer. Where used, a beam steerer serves to steer a spatially modulated light beam emanating from the spatial light modulator through the lens to create images.

In one or more embodiments, the augmented reality companion device 800 includes a companion device display integration manager 824. The companion device display integration manager 824 can be used to communicate with a companion electronic device. Illustrating by example, when another device transmits event notifications, subtitles, or other contextual information to the augmented reality companion device 800, the companion device display integration manager 824 can deliver that information to the augmented reality image presentation device 821 for presentation to the user as an augmented reality experience via the projector 822.

The augmented reality companion device 800 of FIG. 8 can operate as a stand-alone electronic device in one or more embodiments. However, in other embodiments, the augmented reality companion device 800 can operate in tandem with an electronic device, via wireless electronic communication using the wireless communication device 813 or via a wired connection channel 823 to form an augmented reality system. When the electronic device is equipped to engage in a videoconference, it is revered to as a "conferencing system terminal device." FIG. 6 above depicts one such device.

Figure 9:
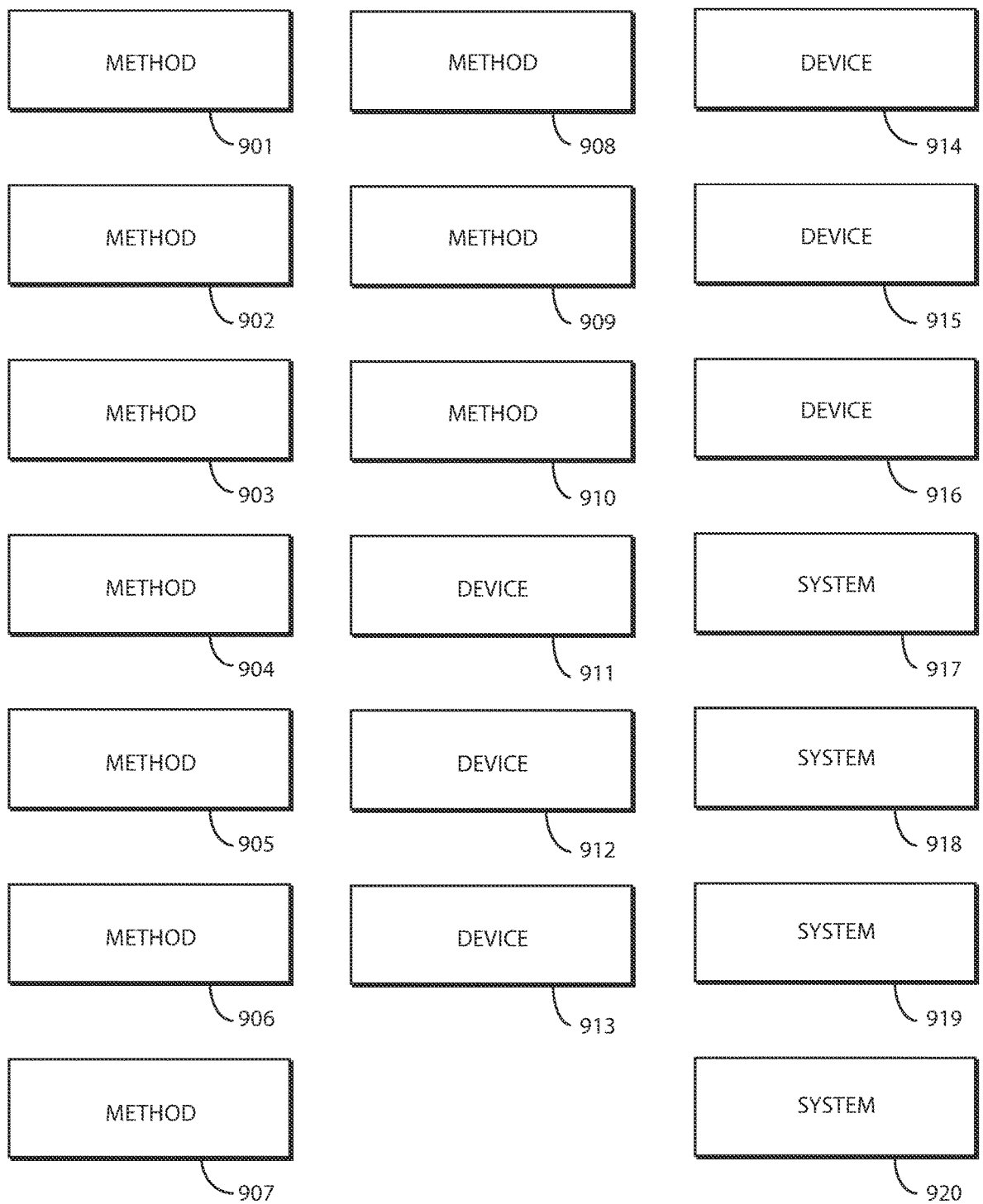
FIG. 9 illustrates various embodiments of the disclosure.

Turning now to FIG. 9, illustrated therein are various embodiments of the disclosure. The embodiments of FIG. 9 are shown as labeled boxes in FIG. 9 due to the fact that the individual components of these embodiments have been illustrated in detail in FIGS. 1-8, which precede FIG. 9. Accordingly, since these items have previously been illustrated and described, their repeated illustration is no longer essential for a proper understanding of these embodiments. Thus, the embodiments are shown as labeled boxes.

At 901 a conferencing system terminal device comprises an image capture device capturing images of a subject during a videoconference occurring across a network. At 901, the conferencing system terminal device comprises a communication device transmitting the images to at least one remote electronic device engaged in the videoconference.

At 901, the conferencing system terminal device comprises one or more sensors determining that one or more portions of the subject are obscured in the images and one or more processors. At 901, the one or more processors apply obscured subject compensation content to the images at locations where the one or more portions of the subject are obscured, during the videoconference, and prior to the communication device transmitting the images to the at least one remote electronic device engaged in the videoconference.

At 902, the one or more sensors of 901 determine that at least one portion of the subject is obscured by eyewear. At 902, the obscured subject compensation content comprises imagery depicting eyes of the subject.

At 903, the obscured subject compensation content of 902 is presented within an outer boundary defined by frames of the eyewear. At 904, the eyewear of 903 comprises sunglasses.

At 905, the obscured subject compensation content of 904 comprises computer generated images of the eyes of the subject. At 906, the eyewear of 902 comprises an augmented reality content presentation companion device. At 907, the obscured subject compensation content of 906 comprises images of the eyes of the subject captured by the augmented reality content presentation companion device. At 908, the augmented reality companion device of 907 comprises augmented reality glasses.

At 909, the one or more processors of 901 comprise one or more facial portions of the subject. At 910, the obscured subject compensation content of 909 comprises depictions of an expression expressed by the subject. At 911, the obscured subject compensation content of 901 comprises an animation of eyes of the subject.

At 912, a method in a video conferencing system comprises identifying, by one or more processors of a conferencing system terminal device, that one or more portions of a subject are obscured in images of the subject captured by an image capture device while the subject is engaged in a videoconference. At 912, the method comprises applying obscured subject compensation content to portions of the images corresponding to the one or more portions of the subject that are obscured to create less obscured images of the subject. At 912, the method comprises transmitting, with a communication device operable with the one or more processors, the less obscured images of the subject across a network to another conferencing system terminal device engaged in the videoconference.

At 913, the application of the obscured subject compensation content of 912 comprises superimposing the obscured subject compensation content atop the portions of the images of the subject corresponding to the one or more portions of the subject that are obscured. At 914, the one or more portions of the subject of 912 are obscured in the images of the subject by eyewear. At 914, the method further comprises ceasing application of the obscured subject compensation content when the subject removes the eyewear.

At 915, the one or more portions of the subject of 912 are obscured in the images of the subject by eyewear. At 915, the application of the obscured subject compensation content comprises superimposing depictions of eyes of the subject within frames of the eyewear.

At 916, the eyewear of 915 comprises at least one imager capturing imagery of the eyes of the subject, with the depictions of the eyes of the subject comprising the imagery of the eyes of the subject captured by at least one the imager. At 917, the obscured subject compensation content of 915 comprises computer generated imagery generated by the one or more processors.

At 918, a conferencing system server complex comprises a video conferencing engine delivering video conferencing content to a plurality of conferencing system terminal devices during a videoconference and an obscured subject monitoring engine. At 917, the conferencing system server complex comprises one or more processors generating obscured subject compensation content when one or more portions of a face of a subject engaged in the videoconference are obscured.

At 918, the one or more processors apply the obscured subject compensation content upon depictions of the one or more portions of the face of the subject in one or more videoconference feeds to create one or more less obscured videoconference feeds. At 918, the conferencing system server complex delivers the one or more less obscured videoconference feeds to the plurality of conferencing system terminal devices.

At 919, the one or more processors of 918 generate the obscured subject compensation content from images of eyes of the subject received from an imager attached to eyewear being worn by the subject in real time as the videoconference is occurring. At 920, the one or more processors of 918 generate a plurality of obscured subject compensation content for each videoconference feed in which a corresponding subject's face is at least partially obscured.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A conferencing system terminal device, comprising:
   an image capture device capturing images of a subject during a videoconference occurring across a network;
   a communication device transmitting the images to at least one remote electronic device engaged in the videoconference;
   one or more sensors determining that one or more portions of the subject are obscured in the images by eyewear; and
   one or more processors;
   the one or more processors applying obscured subject compensation content to the images at locations where the one or more portions of the subject are obscured, during the videoconference, and prior to the communication device transmitting the images to the at least one remote electronic device engaged in the videoconference;
   wherein the eyewear comprises an augmented reality content presentation companion device equipped with another image capture device and the obscured subject compensation content comprises images of eyes of the subject presently being captured by the another image capture device of the augmented reality content presentation companion device.

2. The conferencing system terminal device of claim 1, wherein the obscured subject compensation content further comprises depictions of an expression expressed by the subject.

3. The conferencing system terminal device of claim 2, wherein the obscured subject compensation content is presented within an outer boundary defined by frames of the eyewear, which are also presented in the images.

4. The conferencing system terminal device of claim 2, wherein the eyewear comprises sunglasses.

5. The conferencing system terminal device of claim 1, wherein the eyewear comprises one of goggles, a mask, a shield, or a visor.

6. The conferencing system terminal device of claim 1, wherein the eyewear comprises clear lenses and electronics or other components that partially obscure the eyes of a wearer through the clear lenses.

7. The conferencing system terminal device of claim 1, wherein the another image capture device is disposed within frames or stems of the eyewear.

8. The conferencing system terminal device of claim 1, wherein the augmented reality content presentation companion device comprises augmented reality glasses comprising:
   clear lenses through which the eyes of a wearer of the augmented reality glasses can at least partially be seen;
   components that partially obscure the eyes of the wearer through the clear lenses;
   a projector arranged with the components situated behind the clear lenses; and
   a holographic optical element carried by the augmented reality glasses;
   wherein the projector is configured to deliver augmented reality images to the holographic optical element when the augmented reality glasses are operating in an augmented reality mode of operation.

9. The conferencing system terminal device of claim 8, wherein the another image capture device comprises a video capture device configured to capture images within a vicinity of the augmented reality glasses through the clear lenses.

10. The conferencing system terminal device of claim 1, wherein the one or more portions comprise one or more facial portions of the subject.

11. The conferencing system terminal device of claim 1, wherein application of the obscured subject compensation content occurs in response to user input received by the conferencing system terminal device.

12. A method in a video conferencing system, the method comprising:
   identifying, by one or more processors of a conferencing system terminal device, that one or more portions of a subject are obscured in images of the subject captured by an image capture device while the subject is engaged in a videoconference;
   applying obscured subject compensation content to portions of the images corresponding to the one or more portions of the subject that are obscured to create less obscured images of the subject; and
   transmitting, with a communication device operable with the one or more processors, the less obscured images of the subject across a network to another conferencing system terminal device engaged in the videoconference;
   wherein the one or more portions of the subject are obscured in the images of the subject by eyewear, wherein the applying the obscured subject compensation content comprises superimposing depictions of eyes of the subject within frames of the eyewear;
   wherein the eyewear comprises at least one imager capturing imagery of the eyes of the subject, with the depictions of the eyes of the subject comprising the imagery of the eyes of the subject captured by the at least one imager.

13. The method of claim 12, wherein the applying the obscured subject compensation content comprises superimposing the obscured subject compensation content atop the portions of the images of the subject corresponding to the one or more portions of the subject that are obscured.

14. The method of claim 12, wherein the one or more processors of the subject are obscured in the images of the subject by eyewear, further comprising ceasing application of the obscured subject compensation content when the subject removes the eyewear.

15. The method of claim 12, wherein the eyewear comprises augmented reality glasses.

16. The method of claim 15, wherein the identifying that one or more portions of a subject are obscured in images of the subject captured by an image capture device while the subject is engaged in a videoconference occurs in response to manual user settings configured in a menu or control panel of the conferencing system terminal device.

17. The method of claim 15, wherein the identifying that one or more portions of a subject are obscured in images of the subject captured by an image capture device while the subject is engaged in a videoconference comprises using a temperature sensor to monitor temperature around the conferencing system terminal device.

18. A conferencing system server complex, comprising:
a video conferencing engine delivering video conferencing content to a plurality of conferencing system terminal devices during a videoconference;
an obscured subject monitoring engine; and
one or more processors generating obscured subject compensation content when one or more portions of a face of a subject engaged in the videoconference are obscured, applying the obscured subject compensation content upon depictions of the one or more portions of the face of the subject in one or more videoconference feeds to create one or more less obscured videoconference feeds, and delivering the one or more less obscured videoconference feeds to the plurality of conferencing system terminal devices;
the obscured subject compensation content comprising images of eyes of the subject received from an imager attached to eyewear being worn by the subject in real time as the videoconference is occurring.

19. The conferencing system server complex of claim 18, the obscured subject compensation content presented within images of frames of the eyewear.

20. The conferencing system server complex of claim 18, the one or more processors further generating additional obscured subject compensation content for portions of the subject that are at least partially obscured by an object other than the eyewear.

* * * * *